US008498280B2

(12) United States Patent
Das et al.

(10) Patent No.: US 8,498,280 B2
(45) Date of Patent: Jul. 30, 2013

(54) METHOD AND SYSTEM FOR REDUCING HEADER INFORMATION IN COMMUNICATION SYSTEMS

(75) Inventors: Soumya Das, San Diego, CA (US); Krishnan Rajamani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 625 days.

(21) Appl. No.: 12/730,885

(22) Filed: Mar. 24, 2010

(65) Prior Publication Data

US 2010/0246600 A1    Sep. 30, 2010

Related U.S. Application Data

(60) Provisional application No. 61/164,317, filed on Mar. 27, 2009.

(51) Int. Cl.
  *H04W 4/00* (2009.01)
  *H04B 7/212* (2006.01)
  *H04J 3/14* (2006.01)
  *H04J 3/24* (2006.01)

(52) U.S. Cl.
  USPC ........... 370/338; 370/348; 370/443; 370/473; 370/474; 370/392; 455/450

(58) Field of Classification Search
  USPC ................. 370/328, 338, 252, 392, 394, 465, 370/473, 468, 474
  See application file for complete search history.

(56) References Cited

U.S. PATENT DOCUMENTS

| 7,872,997 | B2* | 1/2011 | Qian .............................. 370/312 |
| 7,912,033 | B2* | 3/2011 | Heidari-Bateni et al. .... 370/350 |
| 8,125,941 | B2* | 2/2012 | Trainin et al. ................. 370/328 |
| 8,306,060 | B2* | 11/2012 | Ngo et al. ..................... 370/473 |
| 2005/0122960 | A1* | 6/2005 | Khan ............................ 370/352 |
| 2005/0254459 | A1* | 11/2005 | Qian ............................. 370/328 |
| 2006/0146868 | A1* | 7/2006 | Ginzburg ..................... 370/465 |
| 2006/0250977 | A1* | 11/2006 | Gao et al. ..................... 370/252 |
| 2007/0053354 | A1 | 3/2007 | Rudolf et al. |
| 2008/0002615 | A1* | 1/2008 | Nakajima et al. ............ 370/328 |

(Continued)

FOREIGN PATENT DOCUMENTS

WO    WO2008133335    11/2008

OTHER PUBLICATIONS

International Search Report and Written Opinion—PCT/US2010/028911, International Search Authority—European Patent Office—Oct. 25, 2010.

*Primary Examiner* — Candal Elpenord
(74) *Attorney, Agent, or Firm* — Charles E. Eggers

(57) ABSTRACT

Systems and methods for reducing overhead in a communication system are disclosed. Different frame types are aggregated into an enhanced aggregated frame in response to a determination that the different frames are suitable for transmission within a single reservation period. In an embodiment, at least two frames of different types are identified, the suitability of an aggregated frame comprising at least a portion of each of the at least two frames for transmission during a first time duration is determined, and if suitable the aggregated frame is formatted for transmission by a transceiver. If unsuitable for transmission in the first time duration, a second time duration longer than the first time duration in which the aggregated frame is suitable for transmission is defined, and the aggregated frame is formatted for transmission by the transceiver.

43 Claims, 17 Drawing Sheets

U.S. PATENT DOCUMENTS

| | | |
|---|---|---|
| 2008/0117919 A1* | 5/2008 | Kliger et al. .................. 370/400 |
| 2008/0133996 A1 | 6/2008 | Naka et al. |
| 2008/0279219 A1* | 11/2008 | Wu et al. ....................... 370/474 |
| 2009/0010263 A1* | 1/2009 | Ma et al. ..................... 370/395.4 |
| 2009/0040930 A1 | 2/2009 | Yonge, III |
| 2011/0096711 A1* | 4/2011 | Liu et al. ....................... 370/312 |

* cited by examiner

MAC HEADER FORMAT

408 →

| Octets: 2 | 2 | 2 | 2 | 2 |
|---|---|---|---|---|
| Frame Control | DestAddr | SrcAddr | Sequence Control | Access Information |
| 502 | 504 | 506 | 508 | 510 |

FIG. 5

FRAME CONTROL FIELD

502 →

| Bits: b15-b14 | b13 | b12-b9 | b8-b6 | b5-b4 | b3 | b2-b0 |
|---|---|---|---|---|---|---|
| Reserved | Retry | Frame Subtype/ Delivery ID | Frame Type | ACK Policy | Secure | Protocol Version |
| 602 | 604 | 606 | 608 | 610 | 612 | 614 |

FIG. 6

METHOD AND SYSTEM FOR REDUCING HEADER INFORMATION IN COMMUNICATION SYSTEMS

CROSS-REFERENCE TO RELATED APPLICATIONS

The present application for patent claims priority to U.S. Provisional Application No. 61/164,317 entitled "METHOD AND SYSTEM FOR REDUCING HEADER INFORMATION IN WIRELESS COMMUNICATION SYSTEMS" filed Mar. 27, 2009, and assigned to the assignee hereof and hereby expressly incorporated by reference herein.

BACKGROUND

1. Field

The disclosure generally relates to communication networks and systems. In particular, the disclosure relates to systems and methods for reducing overhead data for frames or packets in communication networks and systems.

2. Background

Many forms of wireless communication systems and networks are used to transmit various forms of data including, but not limited to, voice, video, multimedia, and packet data. Such data are generally divided into "data frames" for transmission in wireless communications systems and networks. For example, a data file that is sent from a transmitter to a receiver may be divided into a plurality of frames. The frames may then be transmitted from the transmitter to the receiver. Once the receiver has received all of the frames, it may combine the frames to reconstruct the data file.

In addition, communication systems and networks may need command and/or control information to help maintain and manage communications between the transmitter and the receiver. Such command and/or control information may also be sent and received by placing the information in frames. Frames containing command information are generally referred to as "command frames." The term "command frames" should be interpreted broadly and include, but is not limited to, frames used to establish and maintain communications between devices. Frames containing control information are generally referred to as "control frames." The term, "control frames" should be interpreted broadly and includes, but is not limited to, frames that assist in the delivery of data frames between devices. In general, command and/or control frames are often shorter in length and have a smaller payload than data frames.

Each type of frame may comprise framing information including, but not limited to, a preamble, header information, error checking information, and padding information, and may require inter-frame spacing. This framing information may be used by the communication system to transmit, receive, decode and combine the frames. The command and/or control frames may be transmitted in separate frames. Because there is a minimum overhead associated with transmitting a frame, that amount of overhead may be greater than the amount of actual command or control information itself. This may result in wasted overhead when transmitting command and/or control frames. Thus, it is desirable to reduce the framing overhead when transmitting command and/or control frames.

SUMMARY

In one embodiment, the disclosure provides a method of communicating information in a communication system. The information may include a plurality of frames. Each frame in the plurality of frames may include a header and a body. The plurality of frames may be configured to be transmitted by a transceiver, or transmitter. The method comprises identifying at least two frames of different types configured to be transmitted by a transceiver, or transmitter. The method further comprises determining the capability of a first aggregated frame, including at least a portion of each of the at least two frames, to be transmitted by the transceiver within a first time duration, and formatting the first aggregated frame for transmission by the transceiver, if it is determined that the first aggregated frame is suitable for transmission within the first time duration.

In another embodiment the method further comprises placing an aggregation header with the aggregated frame. In another embodiment the method further comprises placing an altered header with each of the at least a portion of the at least two frames of different types. In another embodiment the altered header is a shortened header. In yet another embodiment the shortened header has fewer bits than the original header. In yet another embodiment, the plurality of frames represents voice, video, and/or data representing a physical object or substance. In another embodiment, the plurality of frames may also include command and/or control frames in addition to data frames.

In another embodiment, if the first aggregated frame is not suitable for transmission within the first time duration the method further comprises defining a second time duration that is longer than the first time duration, wherein the aggregated frame is suitable for transmission within the second time duration, and formatting the first aggregated frame for transmission by the transceiver within the second time duration.

In another embodiment each frame of the plurality of frames is originally configured to for transmission in separate time durations. In another embodiment the altered header includes at least one of frame control information, sequence control information and security information.

In yet another embodiment, a first frame of the at least two frames of different types comprises one of a data frame, a command frame, or a control frame, and a second frame of the at least two frames of different types comprises a different one of a data frame, a command frame, or a control frame. In another embodiment the different frames may be configured in any order.

In another embodiment determining the capability of the first aggregated frame to be transmitted within the first time duration includes determining the length of a header of the first aggregated frame, determining the length of a body of the first aggregated frame, and correlating the length of the header and the length of the body with the size of the first time duration.

In yet another embodiment the method comprises determining the capability of at least two frames of different types to be transmitted by a transceiver within a first time duration. If the at least two frames of different types are suitable for transmission within the first time duration, the at least two frames of different types are formatted for transmission by the transceiver within the first time duration.

In another embodiment if the at least two frames of different types are not suitable for transmission within a first time duration the method further comprises determining the capability of the at least two frames of different types to be transmitted within a second time duration that is longer than the first time duration. If the at least two frames of different types are suitable for transmission within the second time duration, the method further comprises formatting the at least two frames of different types for transmission by the transceiver within the second time duration.

BRIEF DESCRIPTION OF THE DRAWINGS

FIG. 5 illustrates an exemplary MAC header format.

FIG. 6 illustrates an example format of a frame control field as shown In FIG. 5.

DETAILED DESCRIPTION

Figure 1A:
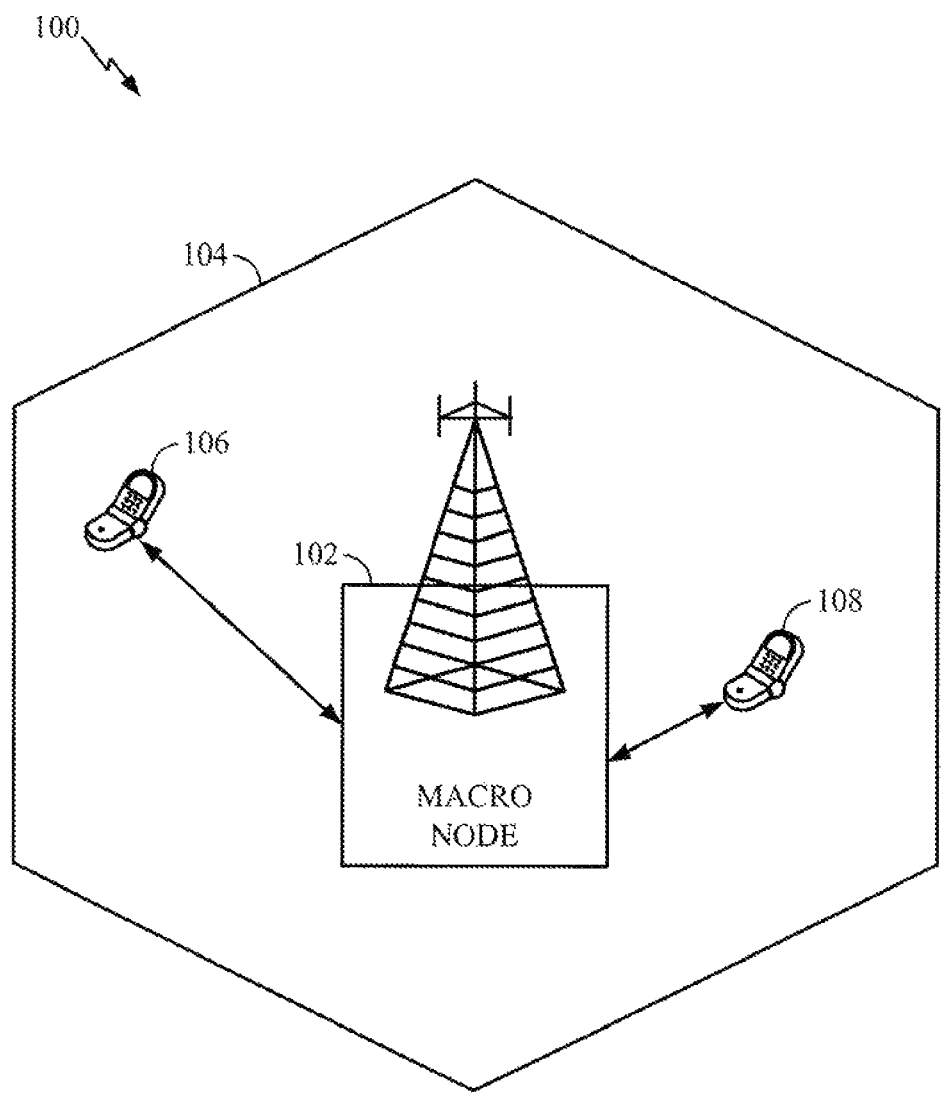
FIG. 1A illustrates a first exemplary wireless communication network 100.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art.

Single carrier frequency division multiple access (SC-FDMA) utilizes single carrier modulation and frequency domain equalization techniques. While SC-FDMA has similar performance and complexity as OFDMA systems, it also has a lower peak-to-average power ratio (PAPR) because of its inherent single-carrier structure. SC-FDMA has drawn great attention, especially in the uplink communications area where lower PAPR greatly benefits the mobile terminal in terms of transmit power efficiency. In addition, SC-FDMA is commonly implemented for the uplink multiple access scheme in 3GPP Long Term Evolution (LTE), or Evolved UTRA.

In some aspects the teachings herein may be employed in a network that includes macro scale coverage (e.g., large area cellular networks such as 3rd Generation (3G) networks, typically referred to as a macro cell network) and smaller scale coverage (e.g., residence-based or building-based network environment). As a wireless communication device moves through such a network, the wireless communication device may be served in certain locations by access nodes that provide macro coverage, while the wireless communication device may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large geographic area may be referred to as a macro node.

Frame aggregation (e.g., combining separate frames into an aggregate frame) at the Medium Access Control ("MAC") layer may be used to amortize (e.g., reduce or mitigate) the framing overhead and increase the MAC efficiency. Certain communication standards may provide a method of data frame aggregation where multiple MAC Service Data Units ("MSDUs") are packed in an aggregate data frame. Another method for reducing the framing overhead and increasing MAC efficiency comprises packing multiple data MAC Protocol Data Units ("MPDUs") into an aggregated MPDU. It will be appreciated that the various embodiments and examples described herein are applicable to numerous communication systems or networks. Frame aggregation is to be interpreted broadly and includes, but is not limited to, placing frames adjacent to each other, interleaving, combining, shortening or modifying frames in any way for transmission.

In general, the methods presented herein for aggregating multiple MSDUs or MPDUs are applicable when the frames are to be transmitted between the same transmitter (e.g. source) and receiver (e.g. destination) address pairs. However, instead of using a transmitter or receiver, a transceiver at both the source and the receiver may be used. Thus, below whenever a transmitter or receiver is mentioned it is envisioned that a transceiver may be used interchangeably. The second method described above may have advantages over the first method, as each MPDU may be individually acknowledged and retransmitted. Errors in the MPDU may be isolated if each successive MPDU starts on a fresh interleaver boundary with a fresh convolutional decoder state. For channels with high bit-error-rate, packet error rate in the first method may increase with the length of the Physical Layer Service Data Unit ("PSDU") where there is only one Frame Check Sequence ("FCS") per PSDU. In one example, data, command, and control frames may originate from a single application, e.g., that is operating on or with the transmitter, or transceiver. In another example, the data, command, and control frames may originate from multiple applications.

In certain communications systems, the above-mentioned methods for aggregation apply to data frames only. In these types of communication systems, the above-referenced methods may not address the amortization of the high framing overhead for control or command frames, which are often shorter than data frames. Framing overhead may comprise any combination of the preamble, a Physical Layer Convergence Protocol ("PLCP") header and inter-frame spacing In other communication systems (e.g., communication systems using 802.11n), different types of frames may be aggregated, but full MAC headers are required.

For communication systems using the WiMedia MAC (e.g., a MAC layer defined by WiMedia), one of the access mechanisms may be the Distributed Reservation Protocol ("DRP"). The DRP may allow a transmitter, or transceiver, to reserve one or more Medium Access Slots ("MASs") to transmit frames. For example, in some communication systems, one MAS is 256 µs. In these communication systems, separate reservation periods may be used for sending command and/or control frames. In other communication systems, a single reservation may be used to transmit both data and command/control frames. In those communication systems where at least one MAS (e.g., 256 µs) is reserved for exchanging command and/or control frames, at least a portion of the slot time remains unused because command and/or control frames are generally shorter in duration than one MAS. An access mechanism known as Prioritized Contention Access ("PCA") may reduce some of the wastage due to unused slot time. Thus, the use of separate MASs for command and/or control frames may result in a significant wastage of MAC capacity due to high framing overhead and the unused MAS time.

The functions described herein may be implemented in hardware, software, firmware, or any combination thereof. Implemented in software, the functions may be stored or transmitted as one or more instructions or code on a computer-readable medium. Computer-readable media include both computer storage media and communication media, including any medium facilitating transfer of a computer program from one place to another. Storage media may be any available media that can be accessed by a general purpose or special purpose computer. By way of example, and not limitation, such computer-readable media include RAM, ROM, EEPROM, CD-ROM and other optical disk storage, magnetic disk storage and other magnetic storage devices, and any other medium that can be used to carry or store desired program code means in the form of instructions or data structures and that can be accessed by a general purpose or special-purpose computer, or a general-purpose or special-purpose processor, such as an application specific integrated circuit ("ASIC"). Also, any connection is properly termed a computer-readable medium. For example, if software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

In an embodiment, a combination of at least one control and/or command frame may be aggregated with a data frame. In another embodiment, one or more control frames may be aggregated with one or more command frames. For example, when the same transmitter, or transceiver, and receiver, or second transceiver, address pair exchange control, command and data frames, the pair can take advantage of aggregating MPDUs across different frame types. In another embodiment, the frame type field encodings in the frame control of the MAC header within the PLCP header may be modified in order to aggregate MPDUs across different frame types.

In addition, other aspects of the frames may be analyzed in order to determine if the frames should be aggregated. In one embodiment, if the frames require a high quality of service (QoS) with regards to latency i.e. are time-sensitive, the transmitter, or transceiver, will not aggregate the frames as it needs to flush out the frames as quickly as possible. In another embodiment, if an acknowledgement ("ACK") is required after sending the aggregated frame and there is insufficient time to accommodate the ACK within the reservation duration, the transmitter, or transceiver, may not send the aggregated frame. In yet another embodiment, if the network is lightly loaded then the transmitter, or transceiver, may not aggregate the frames as the wasted MASs do not have any adverse impact.

FIG. 1A illustrates an exemplary wireless communication network 100. The illustrated wireless communication network comprises a macro node 102, a cell 104, a wireless communication device 106, and another wireless communication device 108. The wireless communication network 100 is configured to support communication between a number of users. Although the wireless communication network 100 is illustrated as containing only one cell 104, the wireless communication network may comprise any number of cells. Communication coverage in cell 104 may be provided by the macro node 102, which may comprise, for example, a base station. The macro node 102 may interact with a plurality of wireless communication devices, for example, wireless communication devices 106 and 108.

Each of the wireless communication devices may communicate with the macro node 102 on a forward link ("FL") and/or a reverse link ("RL") at any given moment. A FL is a communication link from a macro node to a wireless communication device. A RL is a communication link from a wireless communication device to a macro node. The macro node 102 may be interconnected to macro nodes in other cells (not shown in this FIG.), for example, by appropriate wired or wireless interfaces. Accordingly, the macro node 102 may communicate with wireless communication devices in other cells (not shown in this figure).

With continuing reference to FIG. 1, the cell 104 may provide service coverage over only a few blocks within a neighborhood or over several square miles in a rural environment. Each cell may be further divided into one or more sectors (not shown in this figure). By including additional cells, the wireless communication network 100 may provide service over a large geographic region, as is well known in the art.

A wireless communication device (e.g., 106) may be any wireless communication device (e.g., a mobile phone, router, personal computer, server, etc.) used by a user to send and receive voice or data over a communications network. A wireless communication device may be referred to as an access terminal ("AT"), and may also be referred to herein as a user equipment ("UE"), as a mobile station ("MS"), or as a terminal device. As shown, wireless communication devices 106 and 108 comprise mobile phones. However, the wireless communication devices may comprise any suitable communication device.

It may be desirable for a wireless communication device (e.g., 106) to transmit information to and receive information from another wireless communication device, such as wireless communication device 108 or a wireless communication device in another cell (not shown in this figure). The wireless communication device 106 may accomplish this by first communicating with the macro node 102 via a wireless link. For example, the wireless communication device 106 may generate and transmit a message to the macro node 102. The macro node 102 may then generate and transmit a message to another wireless communication device, such as wireless communication device 108. The messages may comprise information related to various types of communication (e.g., voice, data, multimedia services, etc.) and may include one or more aggregated frames, as discussed in detail below with reference to FIGS. 4-15.

Figure 1B:
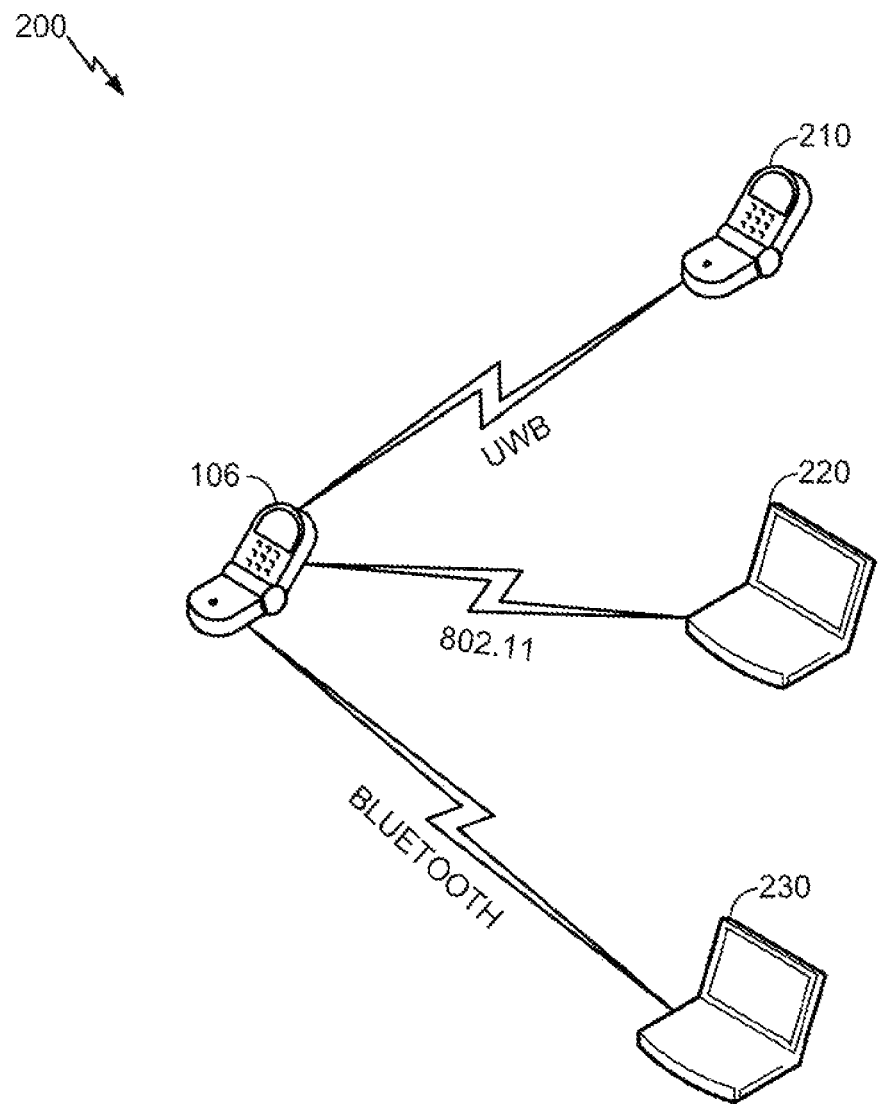
FIG. 1B illustrates a second exemplary wireless communication network 200

FIG. 1B illustrates a second exemplary wireless communication network 200. The illustrated wireless communication network 200 comprises the wireless communications device 106, a second wireless communications device 210, a third wireless communications device 220, and a fourth wireless communications device 230. The wireless communication network 200 may be configured to support communication between a multitude of devices, such as the wireless communications devices 106, 210, 220 and 230. The wireless communications devices (e.g., 210, 220) may comprise, for example, personal computers, PDAs, music players, video players, multimedia players, televisions, electronic game systems, digital cameras, video camcorders, watches, remote controls, headsets, and so on. Although the wireless communications device 106 is illustrated in both FIGS. 1 and 2, the wireless communications device 106 need not be in communication with the wireless communication network 200 and the wireless communication network 100 of FIG. 1A simultaneously.

With continuing reference to FIG. 1B, the wireless communications device 106 may communicate with other wireless communications devices (e.g., 210, 220) over a variety of communication channels. The communication channels may comprise Ultra-Wide Band (UWB) channels, Bluetooth channels, 802.11 channels (e.g., 802.11a, 802.11b, 802.11g, 802.11n), infrared (IR) channels, ZigBee (802.15) channels, or a variety of other channels, as is well known in the art. In one embodiment, the channel may be a UWB channel conforming to the ECMA-368 standard.

The wireless communications network 200 may comprise a wireless local area network (WLAN) covering a physical area, like a home, office, or a group of buildings. A WLAN may use standards such as the 802.11 standard (e.g., 802.11g), and/or other standards for wireless communications. A WLAN may use a peer-to-peer communication in which the wireless communication devices directly communicate with each other. The wireless communications network 200 may also comprise a wireless personal area network (WPAN), spanning, for example, an area of a few meters. A WPAN may use standards such as infrared, Bluetooth, a WiMedia based UWB standard (e.g., ECMA-368), and ZigBee standards, and/or other standards for wireless communications. A WPAN may use a peer-to-peer communication in which the wireless communication devices directly communicate with each other. The wireless communications network 200 may connect to another network, such as the wireless communications network 100 or the Internet, through a device such as the wireless communications device 106.

The messages sent across the wireless communications network 200 may comprise information related to various types of communication (e.g., voice, data, multimedia services, etc.) and may include aggregated frames, as discussed in detail below with reference to FIGS. 4-15.

Although the following embodiments may refer to FIG. 1B and particularly the ECMA-368 standard, they may also be applicable to the communication system 100 shown in FIG. 1A and other communication standards. For example, one embodiment may be applicable in a UMTS communication system. Another embodiment may be applicable in an OFDMA communication system.

The ECMA-368 standard specifies a physical layer (PHY) and a medium access control (MAC) sublayer for ultra-wideband (UWB) communication systems. For example, the ECMA-368 standard may be used in a high-speed, short-range wireless network. The ECMA-368 standard may use all or part of the frequency spectrum between 3100-10,600 MHz and may support data rates of up to 480 Mb/s, or even higher. The ECMA-368 standard divides the spectrum into 14 bands, each with a bandwidth of 528 MHz. The ECMA-368 standard may use a multi-band orthogonal frequency division modulation (MB-OFDM) scheme to transmit information. Frequency-domain spreading, time-domain spreading, and forward error correction (FEC) coding are provided for optimum performance under a variety of channel conditions.

The MAC sublayer of the ECMA-368 standard may allow a group of devices to continue communicating while merging or splitting from other groups of devices. The functionality of this MAC may be distributed among multiple devices. These functions include distributed coordination to avoid interference between different groups of devices by appropriate use of channels and distributed medium reservations to ensure Quality of Service. The MAC sublayer of the ECMA-368 may provide prioritized schemes for isochronous and asynchronous data transfer. Carrier Sense Multiple Access (CSMA) and Time Division Multiple Access (TDMA) are two different access mechanisms supported in ECMA-368. While they are not combined, both CSMA and TDMA can be supported. The MAC sublayer of the ECMA-368 standard may ensure equitable sharing of the bandwidth.

Figure 2:
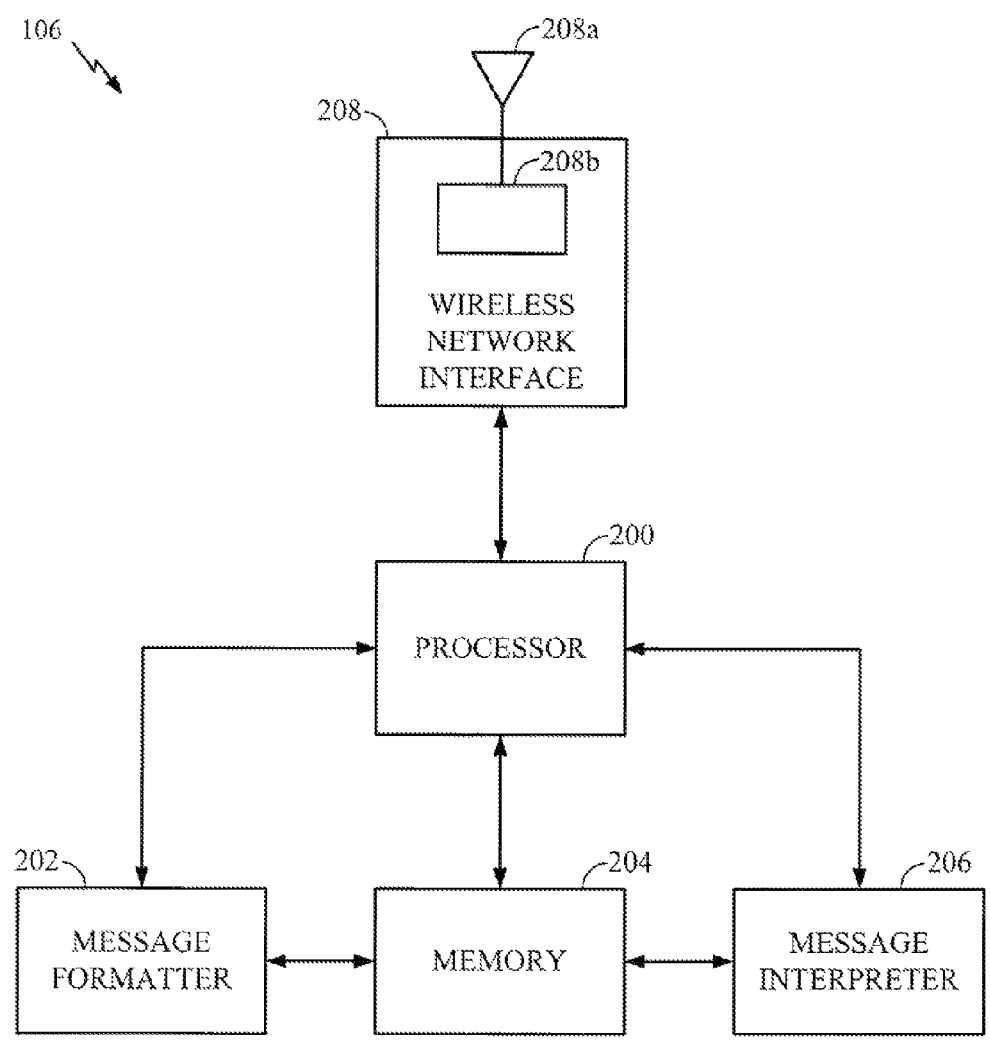
FIG. 2 is a functional block diagram of an exemplary wireless communication device 106 shown in FIG. 1.

FIG. 2 is a functional block diagram of an exemplary wireless communication device 106 shown in FIGS. 1A and 1B. As discussed above, the wireless communication device 106 may be a mobile phone. The wireless communication device 106 may comprise a processor 200 configured to process information for storage, transmission, and/or for the control of other components of the wireless communication device 106. The processor 200 may further be coupled to a memory 204. The processor may read information from or write information to the memory 204. The memory 204 may be configured to store messages before, during or after processing. The memory 204 may also store aggregated frames, as will be discussed in further detail below with reference to FIGS. 7-10. The processor 200 may also be coupled to a wireless network interface 208. The wireless network interface 208 may be configured to receive an inbound wireless message from, and transmit an outbound wireless message to a macro node (e.g., 102). The inbound wireless message may be passed to the processor 200 for processing. The processor 200 may process one or more aggregated frames.

The processor 200 may process the outbound wireless message, and pass the outbound wireless message to the wireless network interface 208 for transmission. Additionally, the processor 200 may identify frames to be aggregated and may aggregate them, as will be discussed in detail below with reference to FIGS. 7-15. The processor 200 may also be coupled to a message interpreter 206. The inbound wireless message received at the wireless network interface 208 from the macro node 102 may be passed to the processor 200 and then be passed by the processor 200 to the message interpreter 206 for additional processing. The message interpreter 206 may also be coupled to the memory 204 to store or retrieve information for use in message interpreting. The message interpreter 206 may interpret aggregated frames.

The processor 200 may also be coupled to a message formatter 202. The message formatter 202 may generate or format the outbound wireless message to be transmitted by the wireless network interface 208. The wireless outbound message may be passed by the message formatter 202 to the processor 200 for transmission by the wireless network interface 208 to a macro node (e.g., 102). The message formatter 202 may be coupled directly to the memory 204 in order to store or retrieve information for use in message formatting. The message formatter 202 may organize aggregated frames from existing frames and/or insert modified headers with each frame that is part of the aggregated frame, as described in detail below with reference to FIGS. 7-15.

The wireless network interface 208 may comprise an antenna 208a and a transceiver 208b. The wireless network interface 208 may also comprise a convolutional decoder. The transceiver 208b may be configured to modulate/demodulate the outbound/inbound wireless messages going to or coming from the macro node 102. The antenna 208a may transmit/receive the outbound/inbound wireless messages. The antenna 208a may be configured to communicate with the macro node 102 over one or more channels. The outbound/inbound wireless message may comprise voice and/or data-only information (collectively referred to herein as "data"). The wireless network interface 208 may demodulate the data received. The wireless network interface 208 may modulate data to be sent from the wireless communication device 106 via the wireless network interface 208. The processor 200 may provide data to be transmitted.

The memory 204 may comprise a processor cache, including a multi-level hierarchical cache in which different levels have different capacities and access speeds. The memory 204 may also comprise random access memory ("RAM"), other volatile storage devices, or non-volatile storage devices. The storage devices comprising the memory 204 may include hard drives, optical discs, such as CDs or DVDs, flash memory, floppy discs, magnetic tape, and Zip drives.

Although described separately, it is to be appreciated that the functional blocks described with respect to the wireless communication device 106 need not be separate structural elements. For example, the processor 200 and the memory 204 may be embodied in a single chip. The processor 200 may additionally, or in the alternative, contain memory, such as processor registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the wireless communication device 106, such as processor 200, message interpreter 206, and message formatter 202 may be embodied as a general purpose processor, a digital signal processor ("DSP"), an application specific integrated circuit ("ASIC"), a field programmable gate array ("FPGA") or other programmable logic device, discrete gate or transistor logic, discrete hardware components, or any suitable combination thereof designed to perform the functions described herein. One or more of the functional blocks and/or one or more combinations of the functional blocks described with respect to the wireless communication device 106 may also be implemented as a combination of computing devices, e.g., a combination of a DSP and a microprocessor, a plurality of microprocessors, one or more microprocessors in conjunction with a DSP communication, or any other such configuration.

Figure 3:
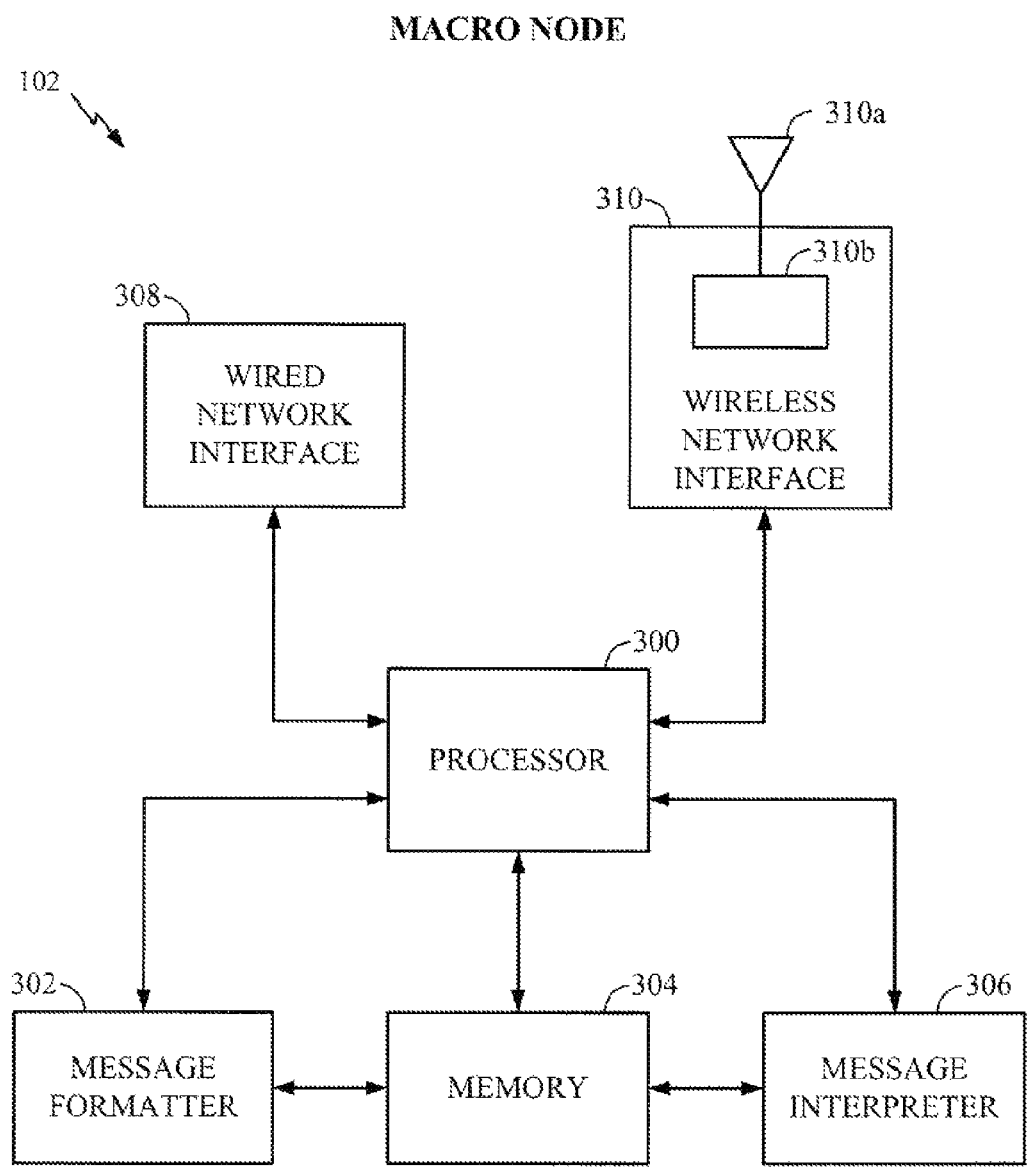
FIG. 3 is a functional block diagram of an exemplary macro node 102 shown in FIG. 1.

FIG. 3 is a functional block diagram of an exemplary macro node 102 shown in FIG. 1. As discussed above with respect to FIG. 1, the macro node 102 may be a base station. The macro node 102 may comprise a wireless network interface 310 configured to receive an inbound wireless message from and transmit an outbound wireless message to one or more wireless communication devices, such as wireless communication device 106. Wireless network interface 310 may be coupled to a processor 300. The processor 300 may be configured to process the inbound and outbound wireless message coming from or going to the wireless communication device 106 via the wireless network interface 310. The processor 300 may process aggregated frames.

The processor 300 may also be configured to control other components of the macro node 102. The processor 300 may be further coupled to a wired network interface 308. The wired network interface 308 may be configured to receive an inbound wired message from and to transmit an outbound wired message to other destinations (e.g., other macro nodes). The wired network interface 308 may receive an inbound wired message and pass the inbound wired message to the processor 300 for processing. The processor 300 may process an outbound wired message and pass the outbound wired message to the wired network interface 308 for transmission.

The processor 300 may further be coupled, via one or more buses, to a memory 304. The processor 300 may read information from or write information to the memory 304. The memory 304 may be configured to store information for use in processing the inbound or outbound, wired or wireless message. The memory 304 may comprise a processor cache, including a multi-level hierarchical cache in which different levels have different capacities and access speeds. The memory 304 may also comprise random access memory ("RAM"), other volatile storage devices, or non-volatile storage devices. The storage may include hard drives, optical discs, such as compact discs CDs or DVDs, flash memory, floppy discs, magnetic tape, and Zip drives. The memory 304 may also store aggregated frames, as will be discussed in further detail below with reference to FIGS. 7-10.

The processor 300 may also be coupled to a message interpreter 306. The processor may pass the inbound wired and wireless message to the message interpreter 306 for processing. The message interpreter 306 may interpret aggregated frames.

The message interpreter 306 may also be configured to extract information from the inbound wireless message received at the wireless network interface 310. For example, the inbound wireless message received from the wireless communication device may comprise aggregated frames. The message interpreter 306 may extract the individual frames comprising identifying information from the aggregated frames. The message interpreter 306 may pass this identifying information to the processor 300 for additional processing. In another example, the message interpreter 306 may be configured to process the inbound wireless message and to provide the processor 300 with information for responding to the inbound wireless message. The message interpreter 306 may also be coupled directly to the memory 304 in order to store or retrieve information for use in message interpretation.

The processor 300 may also be coupled to a message formatter 302. The message formatter 302 may be configured to generate the outbound wired or wireless message. The message formatter 302 may be further configured to pass the generated outbound wired or wireless message to the processor 300. The message formatter 302 may organize aggregated frames from existing frames and/or insert modified headers with each frame that is part of the aggregated frame, as described in detail below with reference to FIGS. 7-15.

The processor 300 may pass the outbound wired or wireless message to the wired network interface 308 or the wireless network interface 310 for transmission. Additionally, the processor 300 may identify frames to be aggregated and may aggregate them, as will be discussed in detail below with reference to FIGS. 7-15.

The wired network interface 308 may transmit outbound wired messages to another macro node. The message formatter 302 may also be coupled directly to the memory 304 in order to store or retrieve information for use in message formatting.

The wireless network interface 310 may comprise an antenna 310*a* and a transceiver 310*b*. The transceiver 310*b* may be configured to modulate/demodulate the outbound/inbound wireless messages going to or coming from a wireless communication device. The antenna 310*a* may transmit/receive the inbound/outbound wireless messages. The antenna 310*a* may be configured to send and/or receive the outbound/inbound wireless messages from the macro node 102 over one or more channels. The outbound/inbound wireless messages may comprise voice and/or data-only information (collectively referred to herein as "data") and may include one or more aggregated frames.

The wired network interface 308 may comprise a modem. The modem may be configured to modulate/demodulate the outbound/inbound wired message going to or coming from another destination/source, such as another macro node. The wired network interface 308 may demodulate the data received according to one or more wired standards using methods known in the art. The demodulated data may be transmitted to the processor 300. The wired network interface 308 may modulate data to be sent from the macro node 102 via the wired network interface 308 according to one or more wired standards using methods known in the art. In addition, the wired network interface 308 may also comprise a convolutional decoder.

Although described separately, it is to be appreciated that functional blocks described with respect to the macro node 102 need not be separate structural elements. For example, the processor 300 and the memory 304 may be embodied in a single chip. The processor 300 may additionally, or in the alternative, contain memory, such as processor registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the macro node 102, such as processor 300, message interpreter 306, and message formatter 302, may be embodied as a general purpose processor, a digital signal processor, an application specific integrated circuit, a field programmable gate array or other programmable logic device, discrete gate or transistor logic, discrete hardware components, or any suitable combination thereof designed to perform the functions described herein. One or more of the functional blocks and/or one or more combinations of the functional blocks described with respect to the macro node 102 may also be implemented as a combination of computing devices, e.g., a combination of a DSP and a microprocessor, a plurality of microprocessors, one or more microprocessors in conjunction with a DSP communication, or any other such configuration.

The functionality of the modules of FIGS. 1-3 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. The functionality described herein (e.g., with regard to one or more of the accompanying FIGS.) may correspond in some aspects to similarly designated "means for" functionality in the appended claims. Referring to FIGS. 1-3, the macro node 102 and the wireless communication device 106 are represented as a series of interrelated functional modules.

Figure 4:
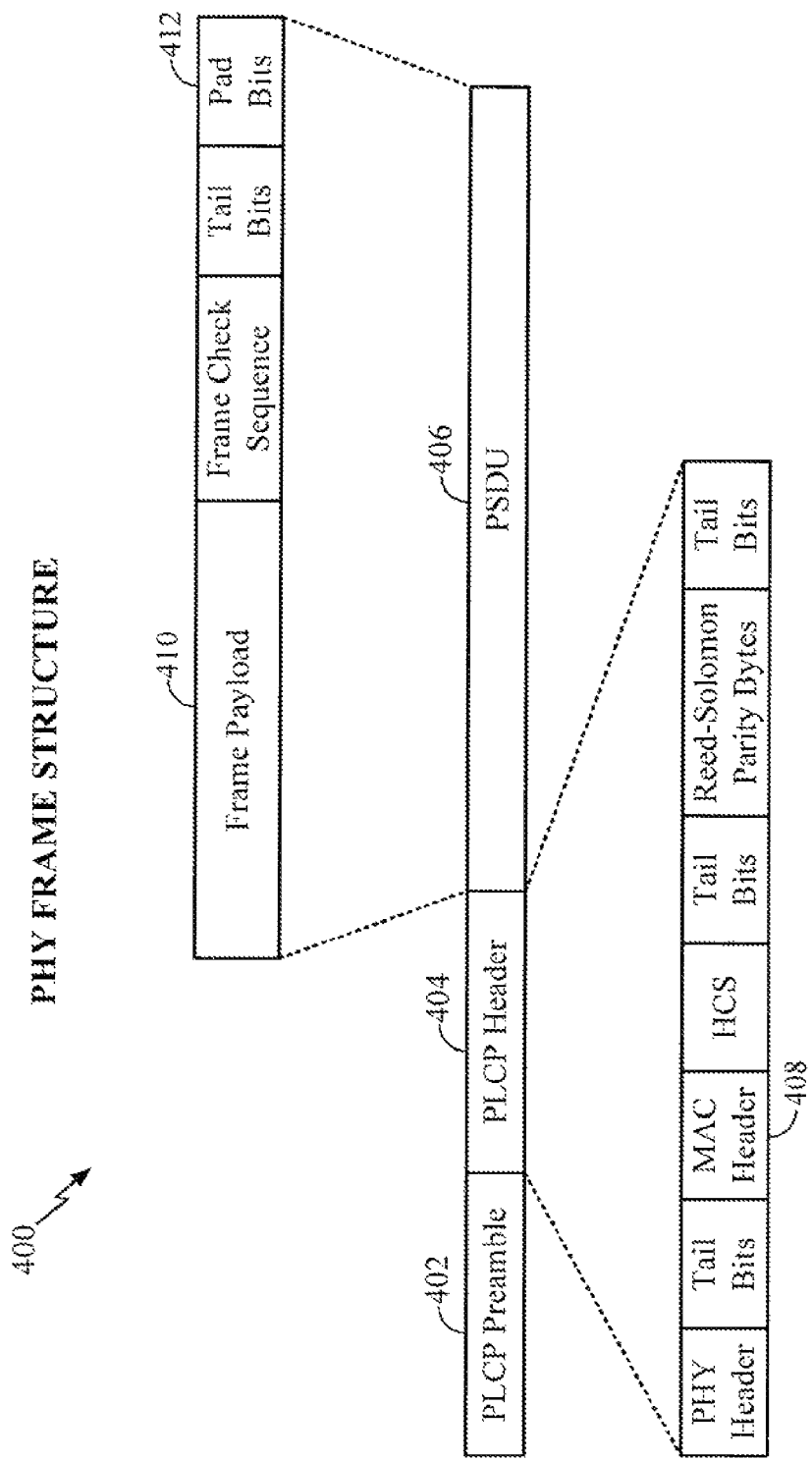
FIG. 4 illustrates an exemplary frame structure conforming to the ECMA-368 standard.

FIG. 4 illustrates an example of a PHY frame structure. The PLCP Protocol Data Unit ("PPDU") may comprise three components: the PLCP preamble 402, the PLCP header 404, and the PSDU 406. The PLCP header 404 may convey necessary information about both the PHY and the MAC to aid in decoding of the PSDU 406 at the receiver.

As illustrated in FIG. 4, the PSDU 406 comprises a frame payload 410, a frame check sequence, tail bits, and pad bits 412. The frame payload 410 may comprise bits of data related to various types of communications (e.g., voice, data, multimedia services, etc.) contained in a packet sent from a wireless communication device (e.g., 106) to a macro node (e.g., 102) or from a macro node to a wireless communication device. The frame check sequence provides checksum characters for the frame to aid in error detection and correction. In embodiments where the wireless network interface (e.g., 208 or 308) contains a convolutional decoder, the tail bits may be added to flush out the decoder so as to reset it to its initial state and improve error probability. The pad bits may be inserted in order to align the data stream on the boundary of the symbol interleaver. In general, padding bits are bits within a frame (e.g., a unit of data used by a communication system) that are used to "pad" a frame to a certain length. For example, in reference to FIG. 1B the communication system 200 may require that all frames sent between the wireless communication devices (e.g., 106 and 220) be 256 bits in length. If the wireless communication device 106 only has 128 bits of data to send in a frame, the wireless communication device 106 may use 128 padding bits to fill the rest of the frame such that the total length of the frame meets the 256 bit length requirement.

With continuing reference to FIG. 4, the PLCP preamble 402 may aid the wireless network interface (e.g., 208 or 308) in timing synchronization, carrier-offset recovery, and channel estimation.

The PLCP header 404 may convey information to a wireless network interface (e.g., 208 or 308) for use in decoding the PSDU 406. As illustrated in FIG. 4, the PLCP header 404 comprises a PHY header, a MAC header 408, a header check sequence, Reed-Solomon parity bytes, and three fields of tail bits. The MAC header 408 will be discussed in detail below with reference to FIG. 5. The header check sequence and Reed-Solomon parity bytes provide improved error detection and correction for the PLCP header 404. Additionally, in embodiments where the wireless network interface contains a convolutional decoder, the tail bits may be added to flush out the decoder so as to reset it to its initial state and improve error probability.

A WiMedia MAC frame includes a fixed-length MAC header and an optional variable length frame body. FIG. 5 illustrates an example MAC header format. As shown in FIG. 5, the MAC header 408 may comprise two octets (e.g., 16 bytes) of frame control information 502, two octets for a destination address 504, two octets for a source address 506, two octets for sequence control information 508, and two octets for access information 510. The size of the frame control information field 502, destination address field 504, source address field 506, control information field 508 and access information field 510 is not limited to two octets each and may comprise more or less octets.

FIG. 6 illustrates an example format of a frame control field 502 of a MAC header 408, as shown in FIG. 5. The frame control field 502 may include reserved bits 602, a retry flag field 604, a frame subtype/deliver ID field 606, a frame type field 608, an ACK policy field 610, a security information field 612, and a protocol version field 614. The size of each field may vary depending on the frame, and is not limited to the number of bits shown in FIG. 6.

Figure 8:
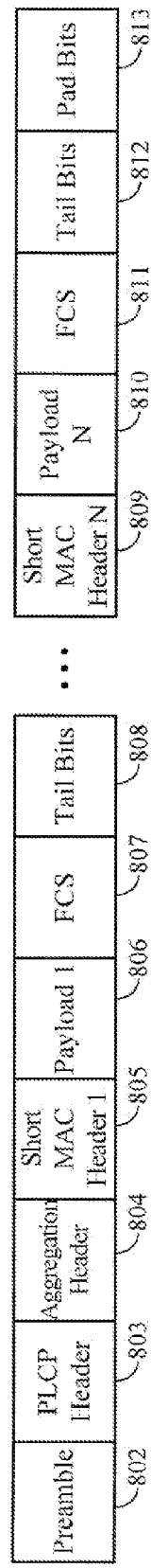
FIG. 8 illustrates an exemplary enhanced aggregated ECMA-368 frame structure according to one embodiment.

In an embodiment, the aggregation of frames of different frame types (e.g., data, control, and/or command frames) exchanged between the same transmitter-receiver pair may amortize the overhead associated with transmitting the data, control and/or command frames. In an embodiment, the overhead associated with the additional preamble, PLCP header, Short Inter-Frame Space ("SIPS") duration etc., for the command/control frame may be reduced or eliminated when the command/control is aggregated (e.g., piggybacked) with data frames. For example, instead of requiring a separate preamble, PLCP header, SIFS duration, etc., for each of the data and command/control frames, a data frame and the command/control frames may be transmitted in an aggregated frame. A detailed example of one embodiment of an aggregated frame is shown in FIG. 8, and discussed below. Sending an aggregated frame with data and command/control frames may eliminate the need for separate framing overhead previously required for each of the command/control frames.

Figure 7A:
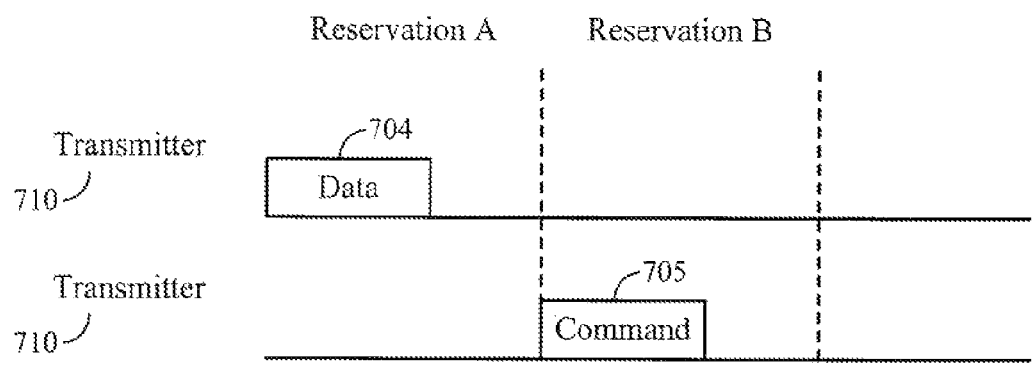
FIG. 7A illustrates a transmitter, or transceiver, transmitting a data frame and a command frame.

FIG. 7A illustrates Transmitter 710 transmitting a data frame 704 during Reservation A and a command frame 705 during Reservation B from Transmitter 710 to a receiver (not shown). The Transmitter 710 may comprise a processor, memory, a message formatter and/or a message interpreter, an antenna, and a transceiver, as described previously with respect to the wireless communication device 106. In an embodiment, Transmitter 710 is wireless communication device 106, or macro node 102. The functions performed by the Transmitter 710, may be carried out by one or more of the wireless network interface (208, 310), processor (200, 300), memory (204, 304), message formatter (202, 302) and/or the message interpreter (206, 306), as described previously.

In the example shown in FIG. 7A, a data frame 704 and a command frame 705 may require separate reservations. There will be additional overhead from the command frame 705 because the command frame 705 may need its own preamble, header information, inter-frame spacing information, and padding information. In addition, command frames are generally smaller than data frames and thus require only a fraction of the reservation allocated to a data frame. Because the reservation is allocated to transmission of a command frame, the unused portion of the reservation may be wasted.

Figure 7B:
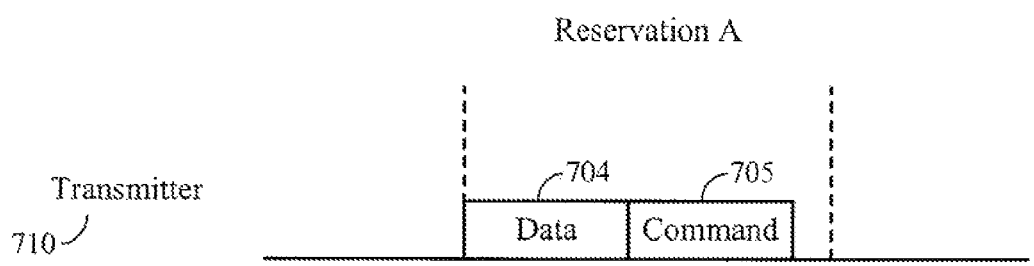
FIG. 7B illustrates an embodiment where the data frame is aggregated with the command frame within an aggregated frame.

FIG. 7B illustrates an embodiment where the data frame 704 is aggregated with the command frame 705 within an aggregated frame. FIG. 7B is a high-level representation of an aggregated frame, which will be explained in more detail below with respect to FIG. 8. According to an embodiment, a Transmitter 710 (i.e., a source) may transmit both the data frame 704 and the command frame 705 as an aggregated frame within the same reservation (Reservation A), rather then sending the data frame 704 in Reservation A and the command frame 705 in Reservation B, as shown above. It will be appreciated that a reservation may also be described in terms of a number of MASs. In another embodiment, a Transmitter 710 may determine whether it should aggregate the command frame 705 and the data frame 704 into an aggregated frame.

As an example, if the estimated size of the aggregated frame would exceed the amount of time that was reserved, Transmitter 710 may choose not to aggregate the command frame 705 with the data frame 704. In another embodiment, if the estimated size of the aggregated frame would exceed the amount of time in Reservation A, Transmitter 710 may choose to increase (e.g. grow) Reservation A by one or more MASs. Having grown Reservation A to the appropriate size, Transmitter 710 may then construct the aggregated frame. If there is unused space in the increased reservation, additional frames, such as more data and command/control frames, may be added to the aggregated frame to fill up the unused space in the increased reservation. Alternatively, additional data, control or command frames can be sent as separate frames to make use of the unused reservation time, and the process may be repeated.

Figure 7C:
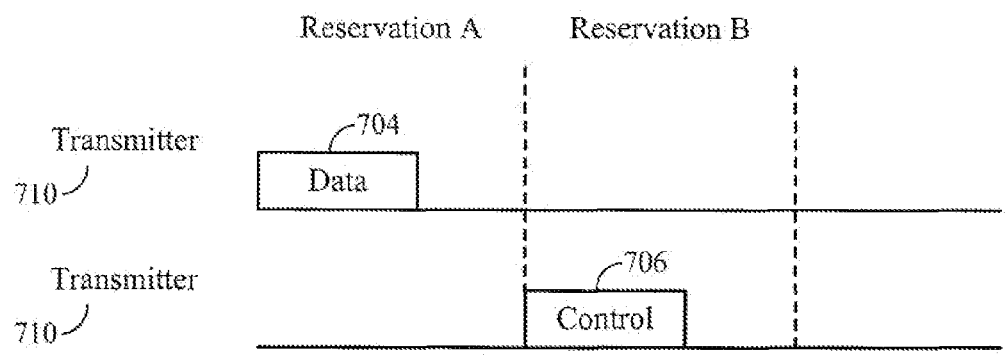
FIG. 7C illustrates a transmitter, or transceiver, transmitting a data frame and a control frame.

FIG. 7C is similar to FIG. 7A described above. However, as shown in FIG. 7C, Transmitter 710 sends a data frame 704 in Reservation A and a control frame 706 in Reservation B, instead of sending a data frame 704 in Reservation A and a command frame 705 in Reservation B.

Figure 7D:
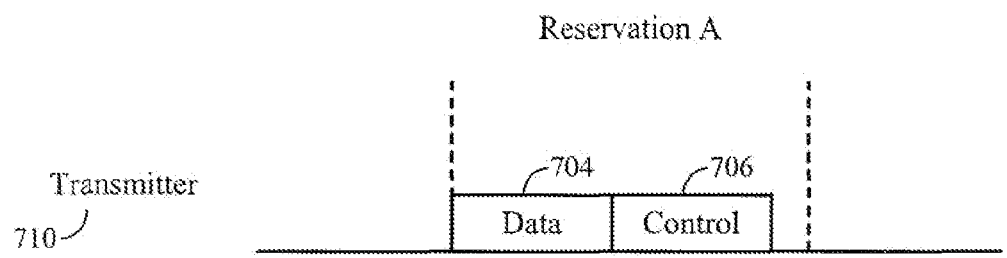
FIG. 7D depicts an embodiment in which a data frame is aggregated with a control frame in an aggregated frame.

FIG. 7D depicts an embodiment in which a data frame 704 is aggregated with a control frame 706 in an aggregated frame. FIG. 7D is a high-level representation of an aggregated frame, which will be explained in more detail below with respect to FIG. 8. As shown in FIG. 7D, Transmitter 710 may transmit both a data frame 704 and a control frame 706 as an aggregated frame within the same reservation (Reservation A), rather than sending the data frame 704 in Reservation A and the control frame 706 in Reservation B. In another embodiment, Transmitter 710 may determine whether it should aggregate the control frame 706 and the data frame 704 into an aggregated frame. In an embodiment, if the estimated size of the aggregated frame would exceed the amount of time that was reserved, the Transmitter 710 may choose not to aggregate the control frame 706 with the data frame 704. In another embodiment, if the estimated size of the aggregated frame would exceed the amount of time that was allocated to Reservation A, Transmitter 710 may choose to increase (e.g., grow) Reservation A by one or more MASs. Having grown Reservation A to the appropriate size, Transmitter 710 may then construct the aggregated frame. If there is unused space in the increased reservation, additional frames may be added to the aggregated frame. Alternatively, additional data, control or command frames can be sent as separate frames to make use of the unused reservation time, and the process may be repeated.

Figure 7E:
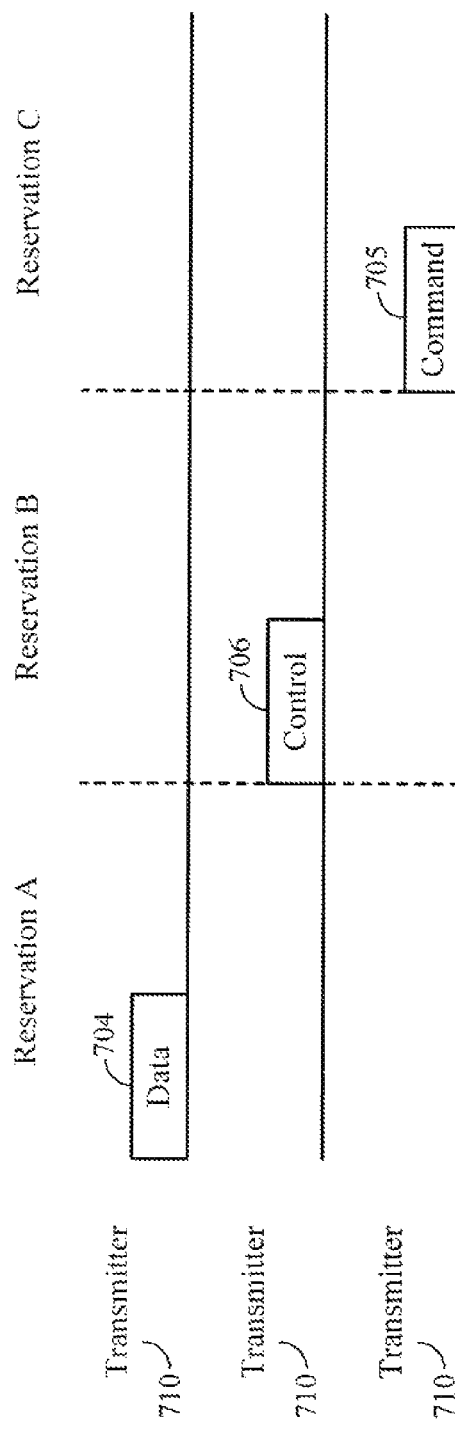
FIG. 7E illustrates a transmitter, or transceiver, transmitting a data frame, a control frame, and a command frame.

FIG. 7E illustrates Transmitter 710 transmitting a data frame 704, a control frame 706, and a command frame 705 to a receiver (not shown).

According to the example shown in FIG. 7E, a data frame 704, a control frame 706, and a command frame 705 may each require separate reservations. This may result in framing overhead from the control and command frames because each may require their own preamble, header information, inter-frame spacing information, and padding information. In addition, control and/or command frames are generally smaller than data frames and generally require only a fraction of the reservations allocated to the control and/or command frames. Because the reservations are allocated to transmissions of the control and/or command frames, the unused portion of the reservation may be wasted.

Figure 7F:
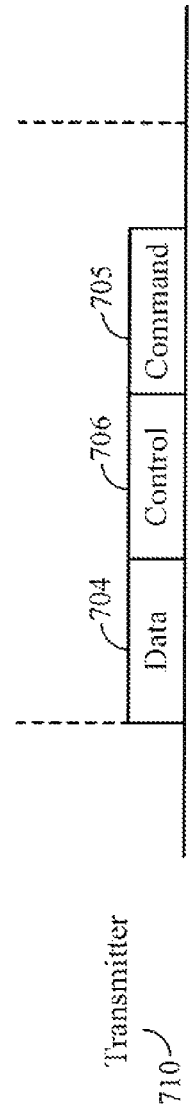
FIG. 7F illustrates another embodiment in which a data frame is aggregated with a control frame and a command frame in an aggregated frame.

FIG. 7F illustrates another embodiment in which a data frame 704 is aggregated with a control frame 706 and a command frame 705 in an aggregated frame.

FIG. 7F is a high-level representation of an aggregated frame, which will be explained in more detail below with respect to FIG. 8. According to an embodiment, Transmitter 710 may transmit all three frames as an aggregated frame within the same reservation, rather than sending the data frame 704 in Reservation A, the control frame 706 in a Reservation B, and the command frame 705 in Reservation C, as shown above. In another embodiment, Transmitter 710 may determine whether it should aggregate the control frame, command frame 705, and the data frame 704 into an aggregated frame. In another embodiment, if the estimated size of the aggregated frame would exceed the amount of time allotted to Reservation A, Transmitter 710 may choose not to aggregate the control frame 706 and the command frame 705 with the data frame 704. The Transmitter 710 can decide to aggregate the data frame and command/control frame if that aggregated frame fits within the reservation A but not the aggregated frame comprising all three—data, command, and control frames. In an embodiment, if the estimated size of the aggregated frame would exceed the amount of time that was reserved in Reservation A, Transmitter 710 may choose to increase (e.g., grow) Reservation A by one or more MASs. Having grown Reservation A to the appropriate size, Transmitter 710 may then construct the aggregated frame. In addition, if there is unused space in the increased reservation, additional frames may be added to the aggregated frame. Alternatively, additional data, control or command frames can be sent as separate frames to make use of the unused reservation time, and the process may be repeated.

Figure 7G:
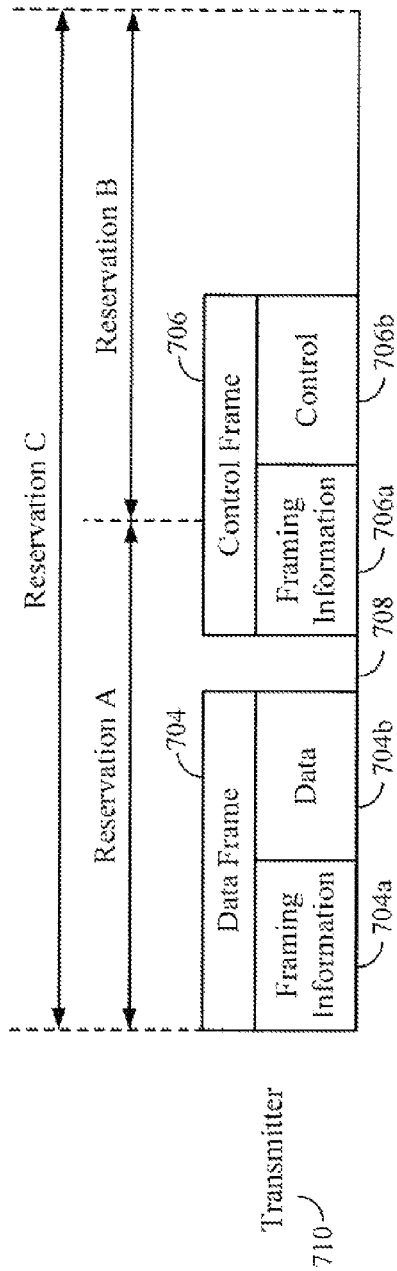
FIG. 7G illustrates an embodiment wherein a data frame and a control frame may be transmitted within a single reservation.

FIG. 7G illustrates an example wherein a data frame 704 and a control frame 706 may be transmitted within a single reservation (Reservation C) with appropriate inter-frame spacing 708. As shown in FIG. 7G, Transmitter 710 transmits a data frame 704 and a control frame 706 to a receiver (not shown). The data frame 704 comprises framing information 704*a* and a data payload 704*b*. The control frame 706 comprises framing information 706*a* and a control payload 706*b*. In this example, Reservation A may, but not necessarily, be the same size as Reservation B (each reservation may comprise one or more MASs). Here, Reservation C is depicted as being the same size as Reservation A and Reservation B combined, however, in some embodiments Reservation C may be larger or smaller than the combination of Reservation A and Reservation B. As shown in FIG. 7G, the data frame 704 and the control frame 706 do not fit within either Reservation A or Reservation B alone. Thus, Transmitter 710 may need to create a larger Reservation C to transmit both the data frame and the control frame 706 within the same reservation. As shown in FIG. 7G; not all of the larger Reservation C is necessarily utilized. This may result in wastage of the capacity of the communication system because portions of the reservations allocated to the Transmitter 710 may not be used due to over-allocation, as reservations can be extended by at least one MAS.

Figure 7H:
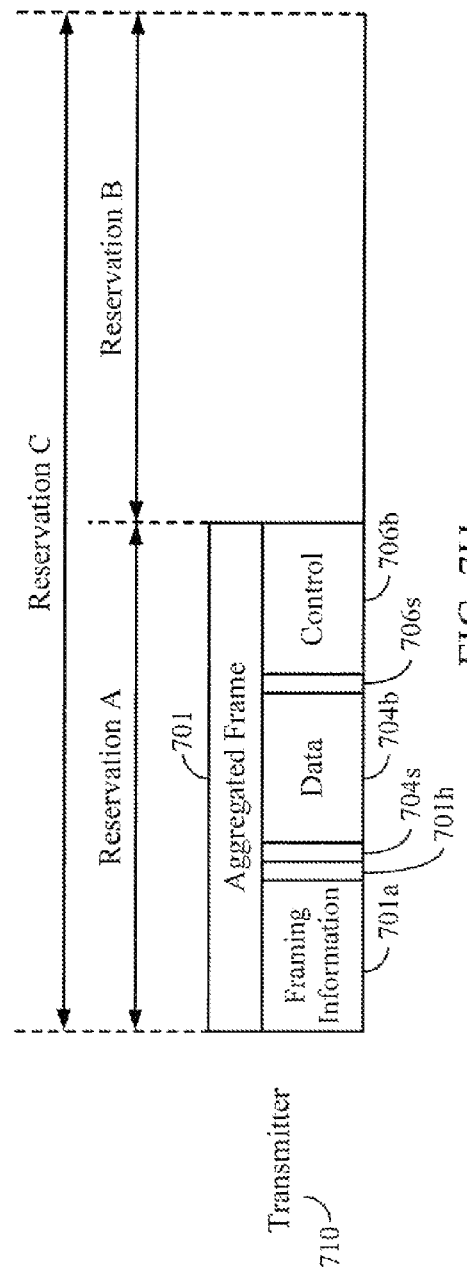
FIG. 7H illustrates an embodiment wherein the data frame is aggregated with the control frame in an aggregated frame.

FIG. 7H illustrates an embodiment wherein the data frame is aggregated with the control frame 706 in an aggregated frame 701. The aggregated frame 701 comprises framing information 701*a*, an aggregation header 701*h*, a data payload 704*b*, and a control payload 706*b*, as well as shortened headers for each frame (704*s* and 706*s*). The aggregated frame fits within Reservation A. In an embodiment, Transmitter 710 transmits an aggregated frame 703 containing a data payload 704*b*, a control payload 706*b*, and a command payload 705*b*, to a receiver (not shown). Transmitter 710 may determine whether it can aggregate the control frame 706 and the data frame 704, as shown in FIG. 7G, into the aggregated frame. If Transmitter 710 determines to aggregate the data frame 704 and the control frame 706, they are combined into the single aggregated frame 701. The aggregated frame may be transmitted within the time allotted to Reservation A alone. Thus, in this embodiment, there is no need to create a larger Reservation C, and thereby the wastage of channel capacity is avoided. Not shown in FIG. 7H are a SIFS duration and guard time which may be disposed between the end of the aggregated frame and the end of the reservation if no ACK is required. More detail is provided below in the event that an ACK is required.

Figure 7I:
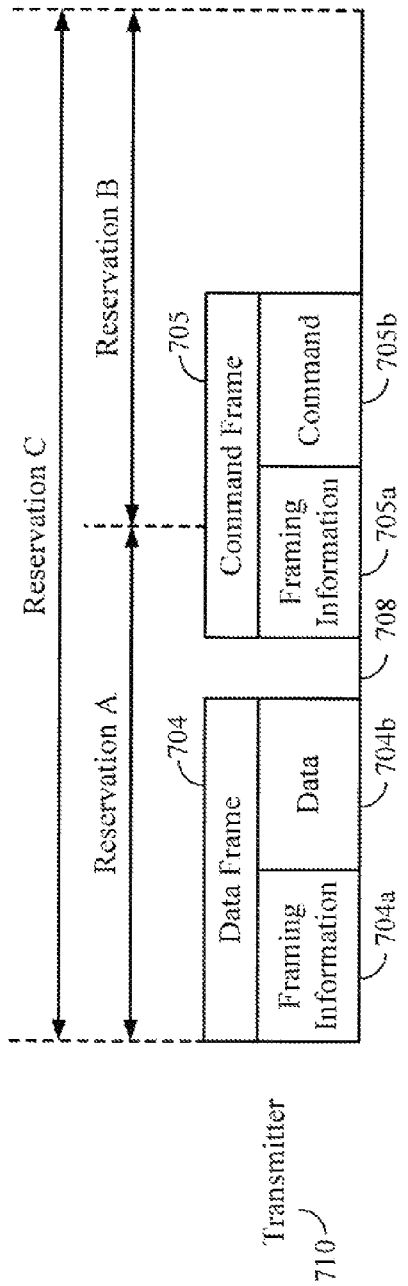
FIG. 7I illustrates an embodiment wherein a data frame and a command frame may be transmitted within a single reservation.

FIG. 7I illustrates an example similar to FIG. 7G, except a command frame 705 and a data frame 704 are being transmitted with appropriate inter-frame spacing 708.

Figure 7J:
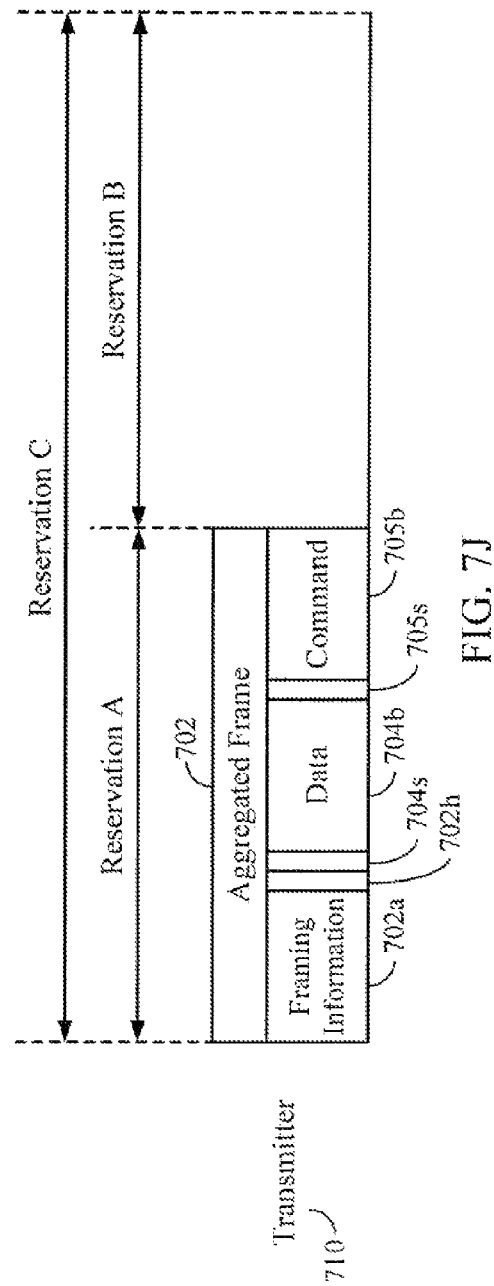
FIG. 7J illustrates an embodiment wherein the data frame is aggregated with the command frame in an aggregated frame.

FIG. 7J illustrates an embodiment wherein a data frame 704 is aggregated with the command frame 705 in an aggregated frame. In an embodiment, Transmitter 710 transmits an aggregated frame 702 containing a data payload and a command payload to a receiver (not shown). The aggregated frame comprises framing information 702*a*, an aggregation header 702*h*, a data payload 704*b* and a command payload 705b, as well as shortened headers for each frame (704s and 705s). The aggregated frame fits within Reservation A. Transmitter 710 may determine whether it can aggregate the command frame 705 and the data frame 704 into the aggregated frame 702. If Transmitter 710 determines to aggregate the data frame 704 and the command frame 705, they are combined into the single aggregated frame 702. The aggregated frame 702 may be transmitted within the time allotted to Reservation A alone. Thus, there is no need to create a larger Reservation C, and thereby the wastage of channel capacity is avoided. Not shown in FIG. 7J are a SIFS duration and guard time, which may be disposed between the end of the aggregated frame and the end of the reservation if no ACK is required. More detail is provided below in the event that an ACK is required.

Figure 7K:
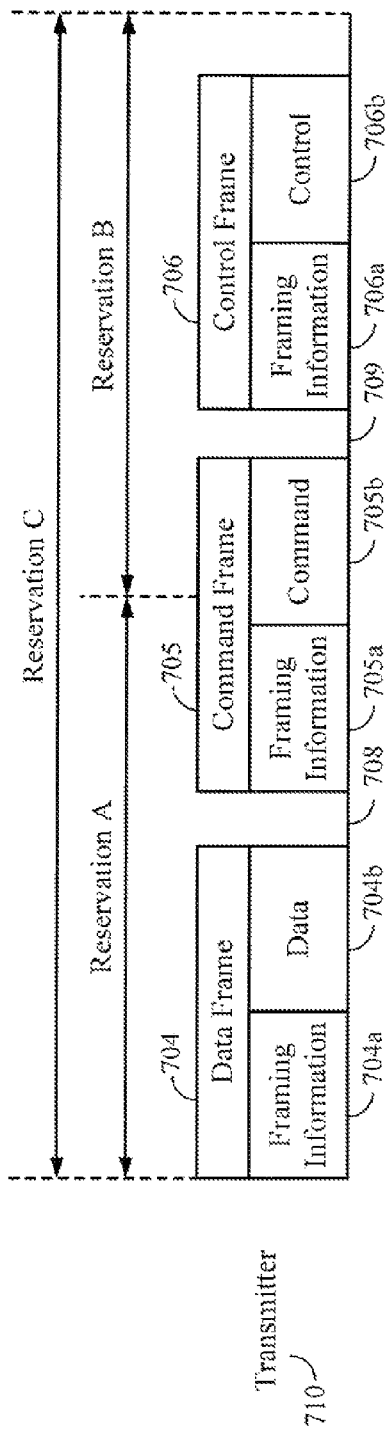
FIG. 7K illustrates an embodiment wherein a data frame, a command frame and a command frame may be transmitted within a single reservation.

FIG. 7K illustrates an example similar to FIGS. 7G and 7I, except a data frame 704, a command frame 705 and a control frame 706 are being transmitted with appropriate inter-frame spacing 708 and 709.

Figure 7L:
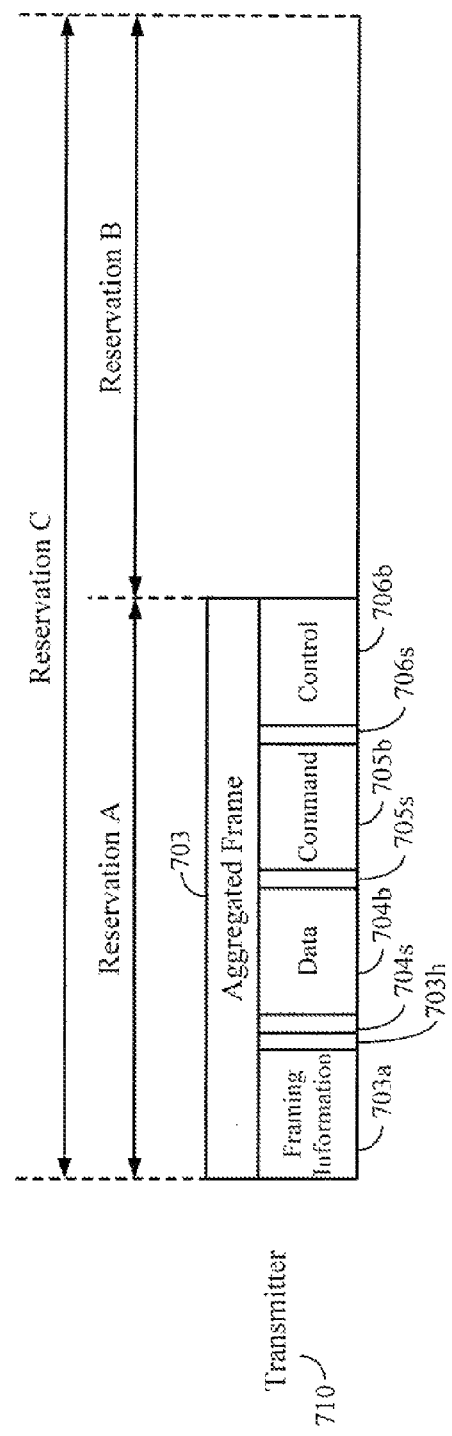
FIG. 7L illustrates an embodiment wherein the data frame is aggregated with the command frame and the control frame in an aggregated frame.

FIG. 7L illustrates an embodiment wherein the data frame is aggregated with the command frame 705 and the control frame 706 in an aggregated frame 703. The aggregated frame comprises framing information 703a, an aggregation header 703h, a data payload 704b, a command payload 705b, and a control payload 706b, as well as shortened headers for each frame (704s, 705s, and 706s). The aggregated frame 703 fits within Reservation A. In an embodiment, Transmitter 710 transmits an aggregated frame 703 containing a data payload 704b, a control payload 706b, and a command payload 705b, to a receiver (not shown). The Transmitter 710 may determine whether it can aggregate the data frame 704, the control frame 706, and the command frame 705, as shown in FIG. 7K, into the aggregated frame 703. If Transmitter 710 determines to aggregate the data frame 704, the control frame 706, and the command frame 705, they are combined into the single aggregated frame 703. The aggregated frame 703 may be transmitted within the time allotted to Reservation A alone. Thus, there is no need to create a larger Reservation C, and thereby the wastage of channel capacity is avoided.

In another embodiment, there may be any combination of data, command, or control frames in the aggregated frame. For example, an aggregated frame may contain two data frames, two command frames, and two control frames. In another example, the aggregated frame may contain one data frame and two control frames, or one control frame and one command frame. Embodiments of the present invention thus provide for combinations of any number of data and any number of command and/or control frames to be combined in any order in an aggregated frame. This embodiment may also allow one of each of data, control and command frames to be combined in an aggregated frame.

In an embodiment, the aggregation of different types of frames may be done opportunistically. For example, an aggregated frame may be created only if there is space within a reservation. In another embodiment, an aggregated frame may be created only if the reservation can be increased by a certain amount and can accommodate the aggregated frame. In another embodiment the transceiver, or transmitter, may make a determination whether or not the different types of frames should be aggregated and then perform the aggregation if it is determined that the frames should be aggregated. A variety of factors may be used in this determination including, but not limited to, reservation size, data frame size, command frame size, control frame size, quality of service (QoS) requirements, which includes latency considerations, amount of network traffic, ACK requirements. In addition, if there is unused space in the increased reservation, additional frames may be added to the aggregated frame. Alternatively, additional data, control or command frames can be sent as separate frames to make use of the unused reservation time.

Table 1 illustrates exemplary identification values for the frame type field 608, as shown in FIG. 6. The identification values shown in Table 1 are decimal equivalents of the binary values that would fill the frame type field 608. In one embodiment, a new frame type, the "enhanced aggregated frame" may be defined to accommodate the aggregation of different types of frames.

TABLE 1

| Identification Value | Frame Type | Description |
| --- | --- | --- |
| 0 | Beacon Frame | WiMedia Beacon Frame |
| 1 | Control Frame | WiMedia Control Frame |
| 2 | Command Frame | WiMedia Command Frame |
| 3 | Data Frame | WiMedia Data Frame |
| 4 | Aggregated data frame | WiMedia Aggregated data frame |
| 5 | Enhanced aggregated frame | New WiMedia frame type where data/control/command frames (any combination of data, command, control) are aggregated |
| 6-7 | Reserved bits | |

Embodiments provide for a separate frame control field for each of the data frame, control or command frame in the enhanced aggregated frame type. Also, there may be a need to have separate sequence control Information for each frame in the enhanced aggregated frame. In addition, there may be a need for security header information for each frame in the enhanced aggregated frame. In general, there may be no need to duplicate the Destination Address, Source Address and Access Information as they may remain the same for all the frames across types in the enhanced aggregated frame.

FIG. 8 illustrates an example of an enhanced aggregated PHY frame 801 according to one embodiment, where aggregation involves frames of different types (e.g., data, command, control, etc.). In an embodiment aggregated frame 801 comprises a Preamble 802, a PLCP header 803, an aggregation header 804 (explained in greater detail with reference to FIG. 9), a short MAC header for each frame in the aggregated frame (805, 809) (explained in greater detail below with reference to FIG. 10), a payload for each frame in the aggregated frame (806, 810), FCS bits (807, 811) and Tail bits (808, 812) for each frame in the aggregated frame, and pad bits 813.

In an embodiment the Preamble 802 and PLCP header 803 are predefined in the WiMedia specification. The destination address, source address and access information in the MAC header of PLCP header may be common for all the aggregated frames. The sequence control fields of MAC header for an enhanced aggregated frame (e.g., in which the frame type is 5) may be set to the default reserved value (e.g., 0). In another embodiment, the sequence control fields may be the same as that in the first short MAC header of the first MPDU in the enhanced aggregated frame. Also in an enhanced aggregated frame, all fields in the frame control of the MAC header of PLCP header (except for Frame Type and Protocol Version) are reserved, e.g., are all set to zero.

Figure 9:
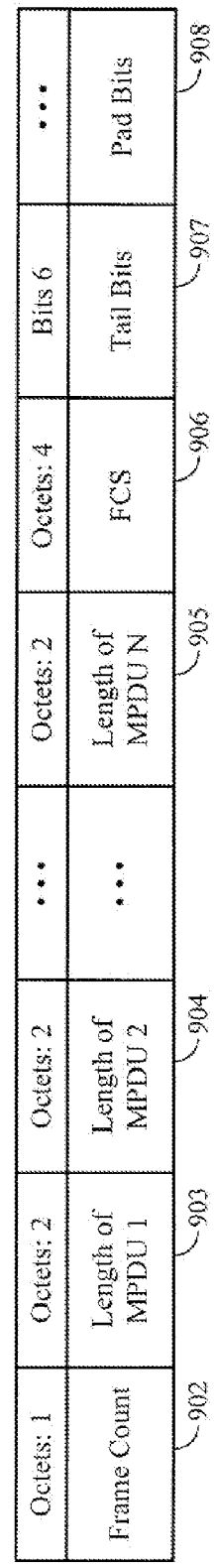
FIG. 9 illustrates the header of the aggregated frame of FIG. 8, according to an embodiment.

FIG. 9 illustrates one embodiment of the aggregation header 804, as shown in FIG. 8. The aggregation header 804 marks the beginning of a WiMedia frame payload, according to one embodiment. In one embodiment the aggregation header 804 comprises a frame count field 902, a length of MPDU field for each individual frame (e.g. 903, 904, 905), an FCS field 906, a tail bits field 907, and a pad bits field 908.

The frame count field 902 may comprise one or more octets of information regarding the number of frames found within the aggregated frame. The length of MPDU fields (903, 904, 905) may comprise multiple octets of information regarding the length or size of each individual frame i.e. payload and the short MAC header, or just the payload. In another embodiment, the length fields may be included as part of the short MAC headers of the MPDU as shown in FIG. 8, and discussed below with reference to FIG. 10. The FCS field 906 contains information for error checking, while the tail bits field 907 contains information to flush out the convolutional decoder so as to reset it to its initial state and thereby decouple the errors in the different frames of the aggregated frame. The pad bits field 908 may contain multiple octets of information, and may be inserted in order to align the data stream on the boundary of the symbol interleaver.

Figure 10:
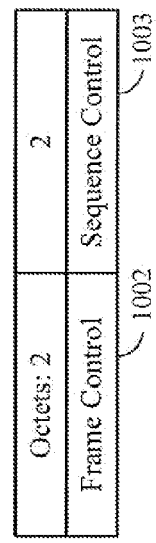
FIG. 10 illustrates a short MAC header in the aggregated PHY frame, according to one embodiment.

FIG. 10 illustrates a short MAC header (e.g. 805 or 809, as shown in FIG. 8) in the aggregated PHY frame, according to one embodiment. A standard MAC header may be used for each frame within the aggregated frame, but this may waste 6 octets per frame. With a short MAC header 805, 809, as shown in FIG. 10, the amount of information that may be needed for the aggregated frame is reduced. In one embodiment the short MAC header may include a frame control field 1002 and a sequence control field 1003. In another embodiment, each MPDU may have its own FCS and tail bits to bring the decoder to zero state and each MPDU may be padded to align with the interleaver symbol boundary. Although not shown in FIG. 10, the short MAC header 805, 809 may additionally comprise security header information and/or a length field. Additional information for the short MAC header may be added as desired or needed.

With references to FIG. 7I, FIG. 7J and FIGS. 8-10 an example of one embodiment will now be given. In this embodiment a data frame 704 and a command frame 705, as shown in FIG. 7I, are aggregated. In this embodiment, the aggregated frame 702 may also be represented as an enhanced aggregated PHY frame 801. The aggregated frame 801 of this embodiment will contain a preamble, PLCP header, aggregation header, two short MAC headers, two frame payloads, fields of FCS and Tail bits for each of the frames in the aggregated frame as well as for the aggregation header itself, and pad bits for each of the frames in the aggregated frame as well as for the aggregation header itself.

The aggregation header of this embodiment will contain a frame count field, two length of MPDU fields for the two payloads, an FCS field, a tail bits field and a pad bits field. In this embodiment the frame count will be two because there is one data frame and one command frame. In this embodiment the length of the data frame payload 704 will be inserted into the length of MPDU 1 field 903 and the length of the command frame payload 705 will be inserted into the length of MPDU 2 field 904. The FCS, tail bits and pad bits fields may also be filled as needed.

In this embodiment, the short MAC header 1 field 805 will contain information specific to the data frame 704, and the short MAC header N field 809 will contain information specific to the command frame 705. In this embodiment, each short MAC header may contain information regarding the frame control, sequence control or other information relating to its respective payload.

In this embodiment, the payload 1 field 806 will contain the information found in the data frame payload 704b. The payload N field 810 will contain the information found in the command frame payload 705b. In addition each payload may have FCS field and a Tail bits field for resetting the decoder and error detection, and a pad bits field to align the data stream on the boundary of the symbol interleaver. In other embodiments there may be a pad bits field for each individual frame in the aggregated frame for alignment within the aggregated frame.

Figure 11:
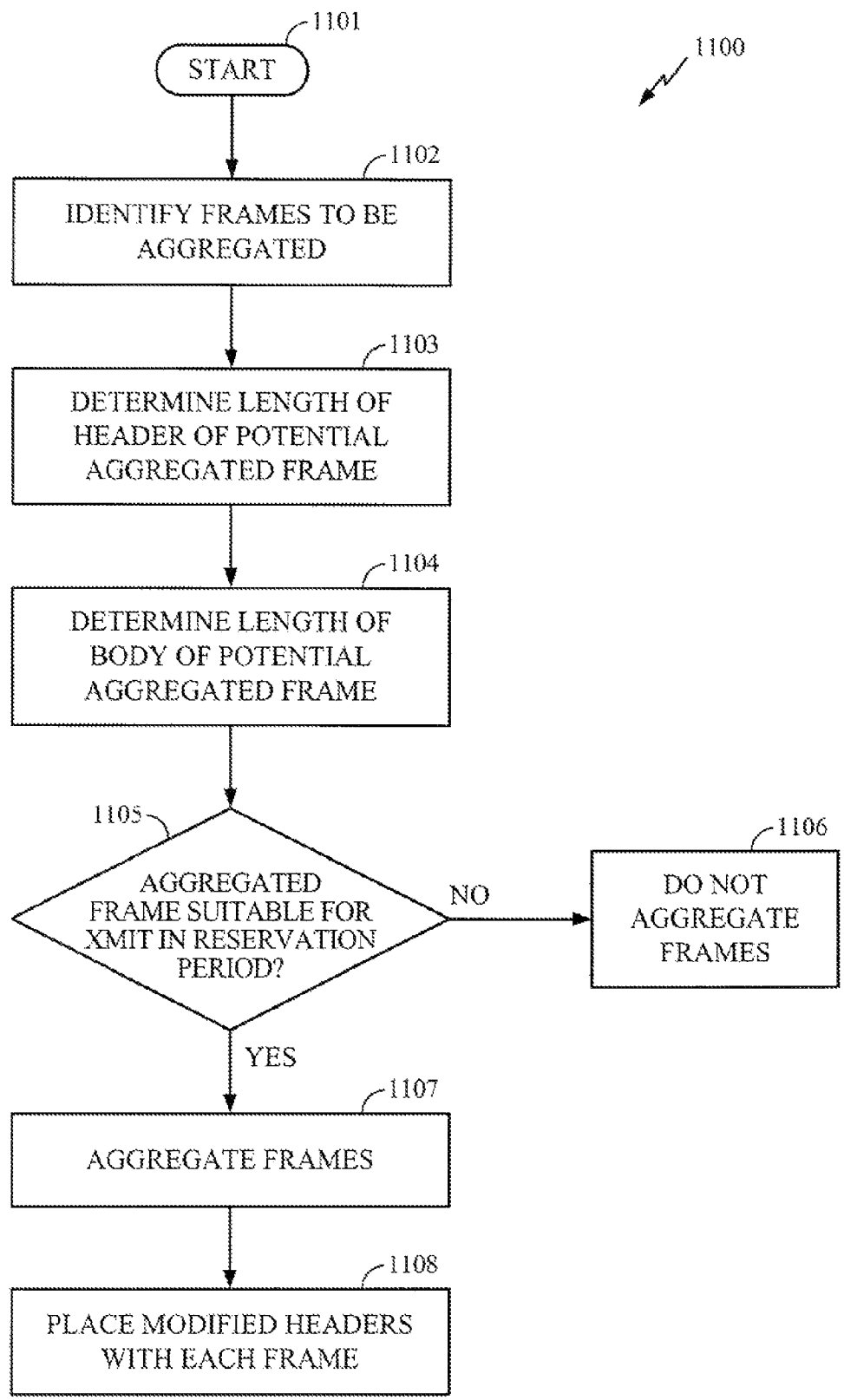
FIG. 11 is a flow chart illustrating a method for aggregating frames of different types according to one embodiment.

FIG. 11 is a flow chart illustrating an example method for aggregating frames of different types according to an embodiment. It will be understood that not all of the illustrated steps are necessarily required, and that this method may be modified without departing from the spirit and scope of the invention. Additionally, this method may be implemented using one or more processors, formatters, interpreters, memories, and/or other devices, as will be described in further detail below. The method 1100, depicted from the perspective of a transmitting device (e.g., 102, 106), starts at 1101. At block 1102, the method identifies at least two frames of different types (e.g. data, command, control, etc.) that are configured to be transmitted by a transceiver (e.g. 208b, 310b), or a transmitter, which may be aggregated into an aggregated frame. In an embodiment, a processor (e.g., 200, 300) or similar device may perform this identification. The aggregated frame comprises at least a portion of each of the at least two frames of different types. The aggregated frame may also include an aggregated header and a shortened MAC header with each portion of the at least two frames At block 1103, the length of the header of the aggregated frame is determined. At block 1104, the length of the body of the aggregated frame is determined. These determinations may be accomplished, for example, by a processor or similar device as discussed above.

At decision block 1105, the suitability of the aggregated frame to be transmitted within a first time duration, or reservation period, is determined. The aggregated frame is suitable for transmission if its characteristics, including, for example, any or all of size, length, and formatting characteristics, are deemed appropriate for transmission. It will be appreciated that other characteristics of an aggregated frame, as well as a variety of techniques, may be used for determining its suitability for transmission. In an embodiment, for example, it is determined whether there is sufficient time within the time duration, or reservation period, to transmit the aggregated frame within the reservation period. In another embodiment the length of the header of the aggregated frame and the length of the body of the aggregated frame may be correlated with the size of the reservation period. Here, the size of the reservation period is also understood to mean the length, or amount of time, or number of MASs, of the reservation period. A processor, or similar device, (e.g., 200, 300) may perform this determination. If the result of the determination is no, the method moves to block 1106 and produces instructions not to aggregate the frames. Additional instructions may be generated to transmit the frames independently, in separate reservation periods.

If the determination at block 1105 is YES, then the aggregated frame is formatted at block 1107 for transmission by the transceiver, or transmitter. The aggregated frame may thus be formatted, for example, at the transmitting device, or by the message formatter, by placing an aggregated header with the body of the aggregated frame and placing a shortened MAC header with each portion of the at least two frames of different types, or by preparing the already assembled aggregated frame for transmission. The aggregated frame may then be transmitted (not shown) by a transmitter, or transceiver, after block 1108, for example.

In addition, similar steps to aggregate additional frames to the aggregated frame may be performed within method 1100. For example, a third frame that is configured to be transmitted by the transceiver may be identified. The capability of a second aggregated frame to be transmitted by the transceiver within the first time duration may also be determined. The second aggregated frame would comprise at least a portion of the first two frames that were part of the first aggregated frame, and at least a portion of the third frame. The second aggregated frame for transmission by the transceiver would be formatted if it is determined that the second aggregated frame is suitable for transmission within the first reservation period. The formatting of the second aggregated frame could be accomplished in a similar matter to what is described previously with respect to the first aggregated frame. The second aggregated frame may then be transmitted within the first reservation period.

Additional frames could be aggregated to the three frames until it is determined that the aggregated frame is not suitable for transmission within the first reservation period, or an extended reservation period, as described above. The aggregated frame, may then be formatted for transmission, as described above, with as many portions of frames as it is suitable for transmission within the reservation period, or extended reservation period. The formatted aggregated frame may then be transmitted.

Additional decisions and functions may be performed alone or in combination with those described in FIG. 11, as illustrated in FIGS. 12-15. These decisions and functions may be performed concurrently or serially with those shown in FIG. 11, and may be combined with each other.

Figure 12:
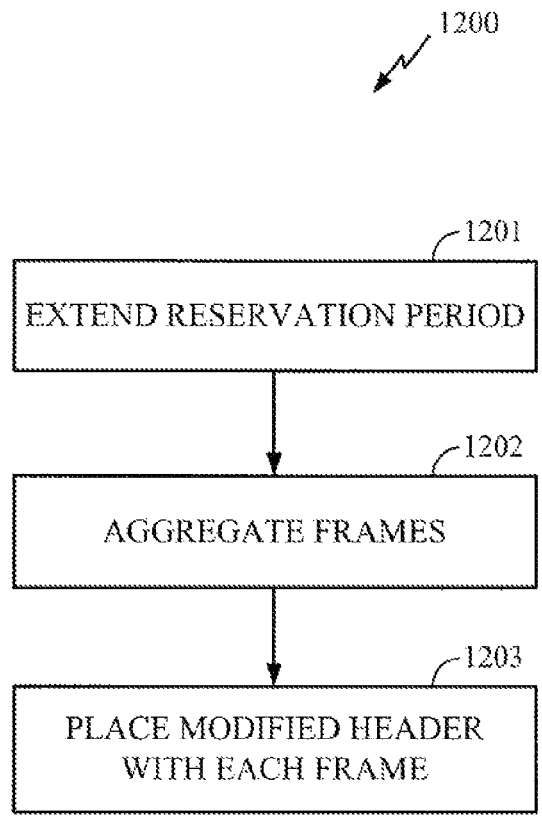
FIG. 12 is a flow chart illustrating a method for extending the reservation period, allowing the aggregated frame to fit within an extended time period.

FIG. 12 is a flow chart illustrating a method 1200 for extending a reservation period, allowing the aggregated frame to fit within an extended time period. Method 1200 includes a block 1201 wherein the reservation period, or time duration, is extended. Block 1201 may be inserted in place of block 1106 of FIG. 11. In this configuration, the method of block 1201 is performed in response to a decision in block 1105 that the aggregated frame, or at least two or more frames, is not suitable for transmission within the time duration, or reservation period. After extending the reservation period, or time duration, so that the aggregated frame is suitable for transmission in block 1201, the method moves to block 1202 and formats the aggregated frame, as discussed above.

Figure 13:
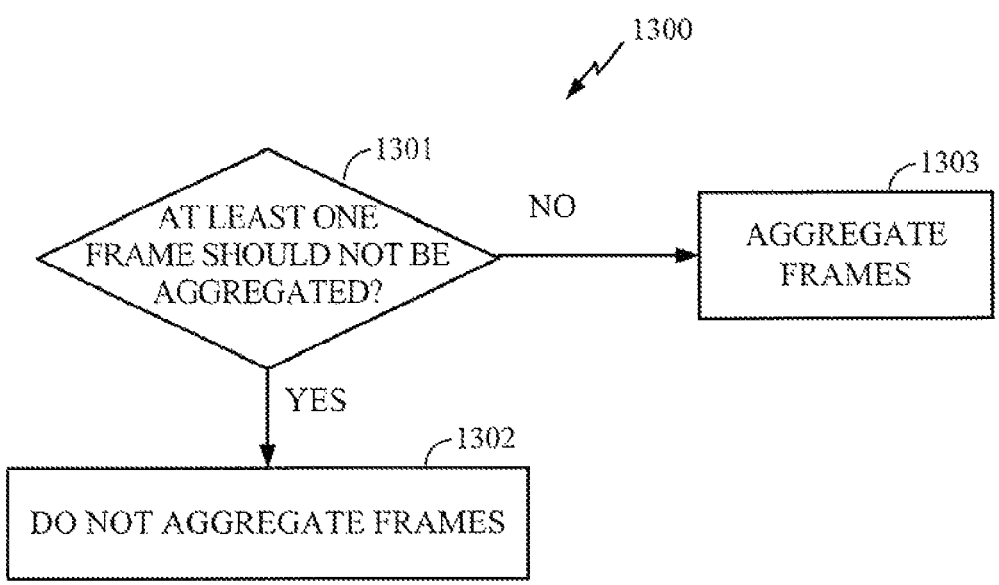
FIG. 13 is a flow chart illustrating another embodiment wherein it is determined if the frames require high quality of service (QoS).

FIG. 13 is a flow chart illustrating another embodiment wherein it is determined if the frames require high quality of service (QoS) i.e. the frames belong to an application layer flow that is delay sensitive. In some instances, frames are considered critical or time-sensitive and aggregating the frames would decrease their quality. In such instances it may be preferable not to aggregate the frames even if it is determined that they would fit within a reservation period. In decision block 1301, the method determines whether certain frames require high QoS, or it is preferable not to aggregate the frames for other reasons. If the method determines in block 1301 that one of the frames should not be aggregated, or it is preferable not to aggregate the frames, then the method 1300 moves to block 1302 wherein the method generates instructions not to aggregate the frames, and to format the frames for independent transmission, in separate reservation periods. Additional instructions can be generated to transmit the frames in their respective reservation periods. If it is determined that the frames do not require high quality service or may be aggregated then the method 1300 moves to block 1303 and aggregates the frames, or formats the aggregated frame as discussed above.

In one embodiment, the decision block 1301 may be inserted between blocks 1101 and 1102 of FIG. 11. In this embodiment, depending on the results of the determination made in decision block 1301 the method will move to either block 1106 or block 1107, described above. Alternatively, method 1300 may be performed concurrently with or after method 1100.

Figure 14:
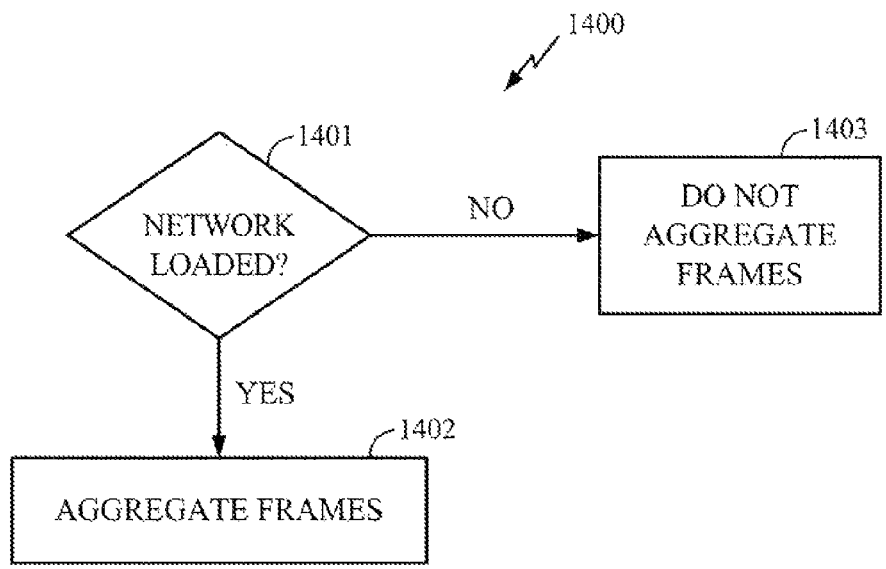
FIG. 14 is a flow chart illustrating another embodiment wherein it is determined if the network is lightly or highly loaded.

FIG. 14 is a flow chart illustrating another embodiment wherein it is determined whether the network is lightly or highly loaded. In some instances, when a network is lightly loaded, aggregating the frames may not improve efficiency, may waste processor resources, or may not be preferred. In such instances it may be preferable not to aggregate the frames even if it is determined that they are suitable for transmission within a reservation period. Decision block 1401 illustrates the determination by the method of whether a network is highly loaded, or substantially loaded. If it is determined that the network is not highly loaded then the method moves to block 1403 wherein instructions are generated not to aggregate the frames, and to format the frames for independent transmission, in separate reservation periods. Additional instructions can be generated to transmit the frames in their respective reservation periods. If it is determined that the network is highly loaded then the method 1400 moves to block 1402 and aggregates the frames, or formats the aggregated frame as discussed above.

In one embodiment, the decision block 1401 may be inserted between blocks 1101 and 1102 of FIG. 11. In this embodiment, depending on the results of the determination made in decision block 1401 the method will move to either block 1106 or block 1107, described above. Alternatively, method 1400 may be performed concurrently with or after method 1100.

Figure 15:
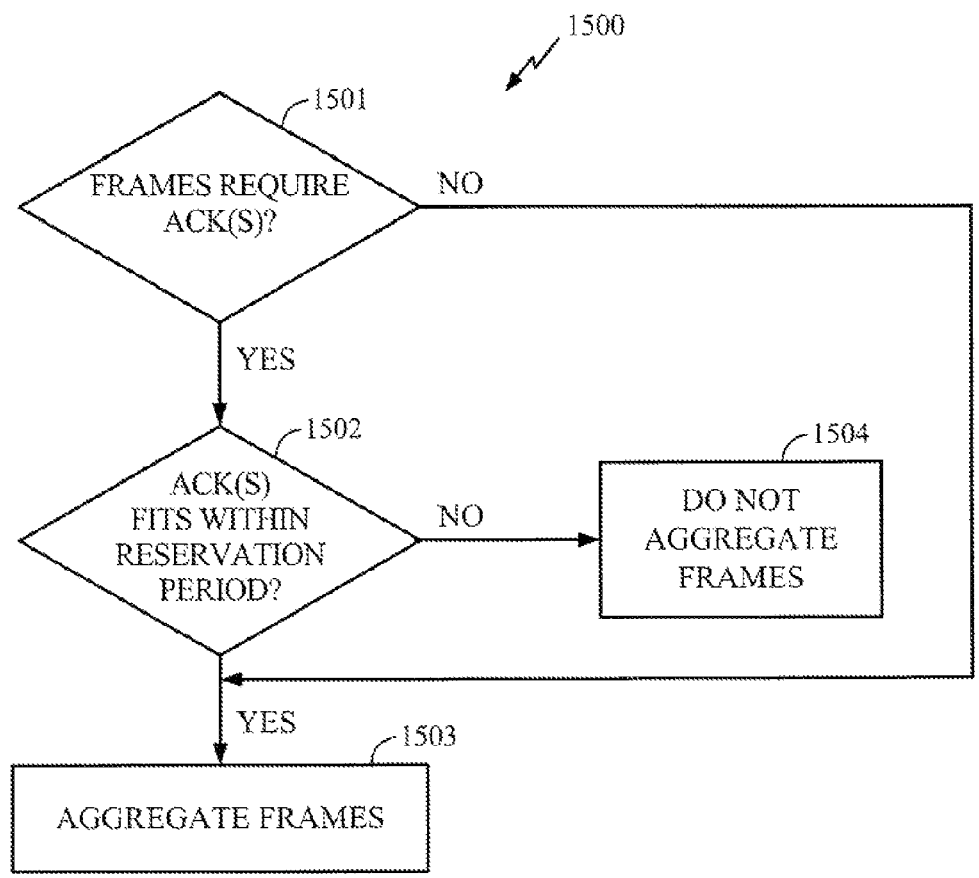
FIG. 15 is a flow chart illustrating another embodiment wherein it is determined if the aggregated frame requires an ACK.

FIG. 15 is a flow chart illustrating another embodiment wherein it is determined if the aggregated frame requires an acknowledgement ("ACK"). For some data frames, transmitting devices require a response message of some form before additional frames may be transmitted. In current systems the response message is generally in the form of an ACK. However, the disclosure is not limited to ACKS, but covers any type of message sent in response to a frame. In current systems, an ACK (or multiple ACKS) may be required to be received during the same reservation period as the transmitted frames. In such instances, it may be preferable not to aggregate the frames even if it is determined that they would fit within a reservation period, if there is insufficient time in the reservation period to include the ACK, or some other response message. Decision block 1501 illustrates the determination of whether certain frames require an ACK (or multiple ACKS). If the method determines that one or more frames require an ACK in decision block 1501, then the method moves to decision block 1502, and determines the capability of the ACK (or multiple ACKS, if necessary) to be transmitted within the reservation period as well as any additional frame spacing. If it is determined that there is insufficient time available in the reservation period to include an ACK (or multiple ACKS), or that the ACK is not suitable for transmission within the reservation period, then the method will move to block 1504 and generate instructions not to aggregate the frames and to transmit the frames independently, in separate reservation periods. If, however, the method determines at decision block 1502 that the ACK, and any additional inter-frame spacing, is suitable for transmission within the reservation period then the method 1500 moves to block 1503 and generates instructions to create the aggregated frame, or to format the aggregated frame as discussed above. Referring back to decision block 1501, if the method determines that no ACK is required then the method moves to block 1503 and generates instructions to aggregate the frames, or to format the aggregated frame as discussed above.

In one embodiment, the decision blocks 1501 and 1502 may be inserted between blocks 1105 and 1107 of FIG. 11. In this embodiment, depending on the results of the determination made in decision blocks 1501 and 1502, the method will move to either block 1106 or block 1107, described above. Alternatively, method 1500 may be performed concurrently with or after method 1100.

Figure 16:
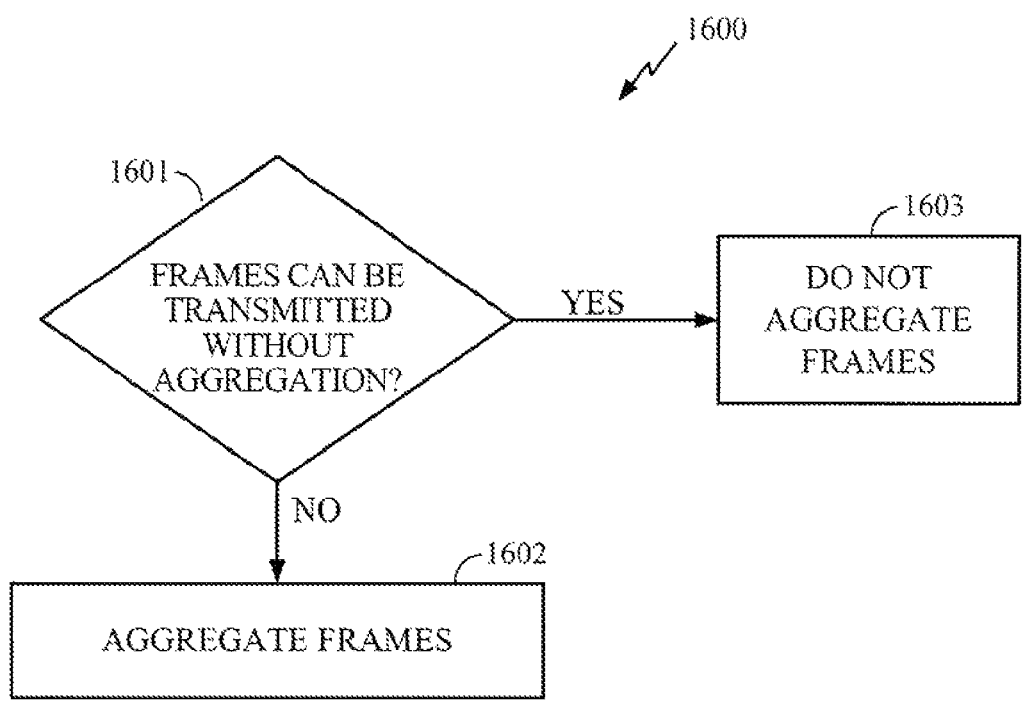
FIG. 16 is a flow chart illustrating another embodiment wherein it is determined whether the frames can be transmitted within a reservation period without being aggregated.

FIG. 16 is a flow chart illustrating another embodiment wherein it is determined whether the frames can be transmitted within a reservation period without being aggregated. In some instances, there may be sufficient space to transmit two frames of different types within a single reservation period without aggregation. In such an instance, it may be more efficient to transmit the frames separately in a single reservation period rather than defining an aggregated frame. Decision block 1601 illustrates the determination by the method of the capability of the frames of different types to be transmitted within a reservation period without defining an aggregated frame. If it is determined that the frames of different types are suitable for transmission within the reservation period, with any necessary inter-frame spacing, etc., then the method moves to block 1603 wherein instructions are generated not to aggregate the frames, and to format the frames for transmission within the reservation period. If it is determined that the frames cannot be transmitted within the reservation period without aggregation then the method 1600 moves to block 1602 and aggregates the frames, or formats the aggregated frame as discussed above.

In one embodiment, the decision block 1601 may be inserted between blocks 1105 and 1107 of FIG. 11. In this embodiment, depending on the results of the determination made in decision block 1601, the method will move to either block 1106 or block 1107, described above. In another embodiment decision block 1601 may be placed between blocks 1104 and 1105 of FIG. 11 or any other location deemed appropriate. Alternatively, method 1600 may be performed before, after, concurrently with, or in place of method 1100.

The above-described methods may be realized in a program format to be stored on a computer readable recording medium that includes any kind of recording device for storing computer readable data, for example, a CD-ROM, a DVD, a magnetic tape, memory card, and a disk, and may also be realized in a carrier wave format (e.g., Internet transmission or Bluetooth transmission).

While specific blocks, sections, devices, functions and modules may have been set forth above, it will be appreciated that there are many ways to partition the system, and that there are many parts, components, modules or functions that may be substituted for those listed above. In addition, the blocks described in the above-referenced FIGS. 11-15 may be performed in a different order, may be performed simultaneously and certain of the steps may be omitted.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. All changes which come within the meaning and range of equivalency of the claims are to be embraced within their scope

What is claimed is:

1. A method of communicating information in a communication system, the information comprising a plurality of frames configured for transmission by a transceiver, the method comprising:

identifying at least two frames of different types, each of the at least two frames of different types configured for transmission by the transceiver;

determining a suitability of a first aggregated frame, comprising at least a portion of each of the at least two frames of different types, for transmission by the transceiver within a first time duration; and formatting the first aggregated frame for transmission by the transceiver, if it is determined that the first aggregated frame is suitable for transmission within the first time duration; and if the aggregated frame is not suitable for transmission within the first time duration:

defining a second time duration which is longer than the first time duration, wherein the aggregated frame is suitable for transmission within the second time duration; and formatting the first aggregated frame for transmission by the transceiver.

2. The method of claim 1, further comprising transmitting the first aggregated frame using the transceiver, if it is determined that the first aggregated frame is suitable for transmission within the first time duration.

3. The method of claim 1, wherein each of the at least two frames of different types includes a header and a body.

4. The method of claim 2, wherein the at least a portion of each of the at least two frames includes the body of each of the at least two frames.

5. The method of claim 1, wherein the aggregated frame further comprises an aggregation header.

6. The method of claim 1, wherein the aggregated frame further comprises an altered header for each of the at least a portion of the at least two frames of different types.

7. The method of claim 6, wherein each of the altered headers includes at least one of frame control information, sequence control information, and security information.

8. The method of claim 1, wherein the at least two frames of different types are configured for transmission during separate time durations.

9. The method of claim 1, wherein a first frame of the at least two frames of different types includes one of a data frame, a command frame, and a control frame, and a second frame of the at least two frames of different types includes a different one of a data frame, a command frame, and a control frame.

10. The method of claim 1, wherein a first frame, a second frame, and a third frame of the at least two frames of different types include any one of a data frame, a command frame, and a control frame.

11. The method of claim 1, further comprising placing at least one of security header information, length information, a frame check sequence, tail bits, and padding bits, with each of the at least a portion of the at least two frames of different types.

12. The method of claim 1, wherein said determining the suitability of the aggregated frame for transmission within the first time duration includes:

determining a length of a header of the first aggregated frame;

determining a length of a body of the first aggregated frame; and correlating the length of the header and the length of the body with a size of the first time duration.

13. The method of claim 12, wherein the body of the first aggregated frame comprises the at least two frames of different types with the altered headers.

14. The method of claim 1, further comprising:
determining if one of the at least two frames of different types is of a type wherein aggregation is not preferred; and
if one of the at least two frames of different types is of a type wherein aggregation is not preferred, transmitting the at least two frames of different types independently.

15. The method of claim 1, further comprising:
determining if a network over which the at least two frames of different types are to be transmitted is substantially loaded; and
if the network over which the at least two frames of different types are to be transmitted is not substantially loaded, transmitting the at least two frames of different types independently.

16. The method of claim 1, further comprising:
determining the suitability of a response message for transmission within the first time duration; and
if the response message is not suitable for transmission within the first time duration, transmitting the at least two frames of different types independently.

17. The method of claim 1, further comprising:
identifying a third frame that is configured for transmission by the transceiver;
determining the suitability of a second aggregated frame, comprising at least a portion of each of the at least two frames and at least a portion of the third frame, for transmission by the transceiver within the first time duration; and
placing an altered header with each of the at least a portion of the at least two frames and the at least a portion of the third frame, if the second aggregated frame is suitable for transmission within the first time duration.

18. The method of claim 12, wherein the third frame has a type which is different from the types of the at least two frames of different types.

19. The method of claim 1, wherein the at least two frames represent at least one of voice, video, and data representing a physical object or substance.

20. The method of claim 1, wherein the time duration includes at least one medium access slot.

21. The method of claim 1, wherein the communication method includes a wireless communication method.

22. The method of claim 1, wherein the plurality of frames include WiMedia MAC frames.

23. A communication device configured to communicate information comprising:
a plurality of frames configured for transmission by a transmitter, each frame of the plurality of frames including a header and a body, and the plurality of frames including at least two frames of different types;
a processor configured to determine a suitability of a first aggregated frame, the first aggregated frame including a header, a body, and at least a portion of each of the at least two frames of different types, for transmission within a first time duration; and
a message formatter configured to format the first aggregated frame for transmission, if the processor determines that the first aggregated frame is suitable for transmission within the first time duration; and
if the aggregated frame is not suitable for transmission within the first time duration:
defining a second time duration which is longer than the first time duration, wherein the aggregated frame is suitable for transmission within the second time duration; and
formatting the first aggregated frame for transmission by the transceiver.

24. The device of claim 23, wherein the transmitter is configured to transmit the first aggregated frame during the extended time duration.

25. The device of claim 23, wherein the message formatter is further configured to place an altered header with each of the at least a portion of the at least two frames of different types in the first aggregated frame.

26. The device of claim 25, wherein the body of the first aggregated frame comprises the at least a portion of each of the at least two frames of different types with the altered headers.

27. The device of claim 26, wherein each of the altered headers includes at least one of frame control information, sequence control information, and security information.

28. The device of claim 23, wherein a first frame of the at least two frames of different types comprises one of a data frame, a command frame, and a control frame, and a second frame of the at least two frames of different types comprises a different one of a data frame, a command frame, and a control frame.

29. The device of claim 23, wherein a first frame, a second frame, and a third frame of the at least two frames of different types comprise any one of a data frame, a command frame, and a control frame.

30. The device of claim 23, wherein the message formatter is configured to place at least one of security header information, length information, a frame check sequence, tail bits and padding bits, with each of the at least a portion of the at least two frames of different types.

31. The device of claim 23, wherein the processor is configured to, when the processor determines the suitability of the first aggregated frame for transmission within the first time duration:
determine a length of the header of the first aggregated frame;
determine a length of the body of the first aggregated frame; and
correlate the length of the header of the first aggregated frame and the length of the body of the first aggregated frame with a size of the first time duration.

32. The device of claim 23, wherein the processor is further configured to:
determine whether at least one of the at least two frames of different types is of a type wherein aggregation is not preferred; and
if the processor determines that the at least one of the at least two frames of different types is of a type wherein aggregation is not preferred, the message formatter is further configured to format the at least two frames of different types for independent transmission.

33. The device of claim 23, wherein the processor is further configured to:
determine if a network over which the at least two frames of different types are to be transmitted is substantially loaded; and
if the processor determines that the network over which the at least two frames of different types are to be transmitted is not substantially loaded, the message formatter is further configured to format the at least two frames of different types for independent transmission.

34. The device of claim 23, wherein the processor is further configured to:
- determine the suitability of a response message for transmission within the first time duration; and
- if the processor determines that the response message is not able to be transmitted within the first time duration, the message formatter is further configured to format the at least two frames of different types for independent transmission.

35. The device of claim 23, wherein the plurality of frames represents at least one of voice, video, and data representing a physical object or substance.

36. The device of claim 23, wherein the time duration includes at least one medium access slot.

37. The device of claim 23, wherein the communication device includes a wireless communication device.

38. The device of claim 23, wherein the plurality of frames include WiMedia MAC frames.

39. The device of claim 23, wherein the transmitter is configured to transmit the first aggregated frame during the first time duration.

40. The device of claim 23, wherein the at least two frames of different types are configured for transmission during different time durations.

41. A method of communicating information in a communication system, the information comprising a plurality of frames, the method comprising:
- determining a suitability of at least two frames of different types for transmission by a transceiver within a first time duration, wherein each frame comprises a header and a body; and
- if the at least two frames of different types are suitable for transmission within the first time duration, formatting the at least two frames of different types for transmission by the transceiver within the first time duration; and
- if the at least two frames are not suitable for transmission within the first time duration,
  - determining the suitability of the at least two frames of different types for transmission within a second time duration which is longer than the first time duration; and
  - if the at least two frames of different types are suitable for transmission within the second time duration, formatting the at least two frames of different types for transmission by the transceiver within the second time duration.

42. A computer program product for communicating information in a communication system, the information comprising a plurality of frames, the computer program product comprising:
- a non-transitory computer-readable medium including code for:
- causing a computer to identify at least two frames of different types configured to be transmitted by a transceiver, wherein each frame comprises a header and a body;
- causing the computer to determine a suitability of a first aggregated frame, the first aggregated frame comprising at least a portion of each of the at least two frames of different types, for transmission by the transceiver within a first time duration; causing the computer to format the aggregated frame for transmission by the transceiver, if it is determined that the aggregated frame is suitable for transmission within the first time duration;
- defining a second time duration which is longer than the first time duration, wherein the aggregated frame is suitable for transmission within the second time duration, and formatting the first aggregated frame for transmission by the transceiver, if the aggregated frame is not suitable for transmission within the first time duration; and
- causing the computer to place an altered header with each of the at least a portion of the at least two frames of different types.

43. A communication device configured to communicate information, the device comprising:
- means for transmitting a plurality of frames, wherein each frame of the plurality of frames includes a header and a body, and the plurality of frames includes at least two frames of different types;
- means for determining a suitability of an aggregated frame comprising at least a portion of each of the at least two frames of different types for transmission within a first time duration; and
- means for formatting the first aggregated frame for transmission during the first time duration by the transmitting means if it is determined that the first aggregated frame is suitable for transmission within the first time duration;
- means for defining a second time duration which is longer than the first time duration; wherein the aggregated frame is suitable for transmission within the second time duration; and
- means for formatting the first aggregated frame for transmission during the second time duration by the transmitting means if it is determined that the aggregated frame is not suitable for transmission within the first time duration.

* * * * *